United States Patent
Imai et al.

(10) Patent No.: US 10,824,002 B2
(45) Date of Patent: Nov. 3, 2020

(54) DISPLAY APPARATUS

(71) Applicant: TIANMA JAPAN, LTD., Kawasaki, Kanagawa (JP)

(72) Inventors: Ayuko Imai, Kawasaki (JP); Ken Sumiyoshi, Kawasaki (JP); Yukie Keicho, Kawasaki (JP)

(73) Assignee: TIANMA JAPAN, LTD., Kawasaki, Kanagawa (JP)

( * ) Notice: Subject to any disclaimer, the term of this patent is extended or adjusted under 35 U.S.C. 154(b) by 0 days.

(21) Appl. No.: 16/263,038

(22) Filed: Jan. 31, 2019

(65) Prior Publication Data
US 2019/0235313 A1    Aug. 1, 2019

(30) Foreign Application Priority Data
Jan. 31, 2018  (JP) ................... 2018-015517

(51) Int. Cl.
*G02F 1/1335* (2006.01)
*G02F 1/1343* (2006.01)
*G02B 27/09* (2006.01)

(52) U.S. Cl.
CPC ... *G02F 1/133526* (2013.01); *G02B 27/0961* (2013.01); *G02F 1/1343* (2013.01); *G02F 1/133504* (2013.01)

(58) Field of Classification Search
None
See application file for complete search history.

(56) References Cited

U.S. PATENT DOCUMENTS

| | | | | |
|---|---|---|---|---|
| 5,497,254 A | * | 3/1996 | Amako | G02B 5/188 |
| | | | | 349/181 |
| 5,499,138 A | * | 3/1996 | Iba | G02B 3/0043 |
| | | | | 345/8 |
| 2003/0214577 A1 | * | 11/2003 | Ishikawa | H04N 13/307 |
| | | | | 348/51 |
| 2011/0096071 A1 | * | 4/2011 | Okamoto | H04N 13/398 |
| | | | | 345/419 |
| 2018/0045860 A1 | * | 2/2018 | Kawanishi | G02B 3/0068 |

FOREIGN PATENT DOCUMENTS

| | | | |
|---|---|---|---|
| JP | 2003-333623 A | | 11/2003 |
| JP | 2007-233253 | * | 9/2007 |
| JP | 2007-233253 A | | 9/2007 |

* cited by examiner

*Primary Examiner* — Ryan Crockett
(74) *Attorney, Agent, or Firm* — Sughrue Mion, PLLC

(57) ABSTRACT

A display apparatus includes a display device configured to display an original image at an original image display position, a second array of a lens array or a pinhole array, and a first array of a lens array or a pinhole array disposed distant from the display device and the second array between the display device and the second array. The first array is configured to form a plurality of elemental images generated from the original image at positions between the first array and the second array. The pitch of the plurality of elemental images is different from lens pitch or pinhole pitch of the second array. The second array is configured to integrate the plurality of elemental images to generate a single reproduced image of the original image.

8 Claims, 23 Drawing Sheets

DISPLAY APPARATUS

CROSS-REFERENCE TO RELATED APPLICATIONS

This Non-provisional application claims priority under 35 U.S.C. § 119(a) on Patent Application No. 2018-15517 filed in Japan on Jan. 31, 2018, the entire content of which is hereby incorporated by reference.

BACKGROUND

This disclosure relates to a display apparatus. An image reproduction technique based on the principle of integral photography called integral imaging has been known. The integral imaging generates a reproduced image (image to be seen) from a plurality of elemental images. A typical display system for integral imaging displays a plurality of elemental images on the screen. Each elemental image is a reduced original image. The display system emits light from the plurality of elemental images through microlenses (elemental lenses) associated with the plurality of elemental images in one-to-one correspondence to form a reproduced image at a specific position in the air distant from the screen.

SUMMARY

An aspect of this disclosure is a display apparatus including: a display device configured to display an original image at an original image display position; a second array of a lens array or a pinhole array; and a first array of a lens array or a pinhole array disposed distant from the display device and the second array between the display device and the second array. The first array is configured to form a plurality of elemental images generated from the original image at positions between the first array and the second array. Pitch of the plurality of elemental images is different from lens pitch or pinhole pitch of the second array The second array is configured to integrate the plurality of elemental images to generate a single reproduced image of the original image.

It is to be understood that both the foregoing general description and the following detailed description are exemplary and explanatory and are not restrictive of this disclosure.

EMBODIMENTS

Figure 1A:
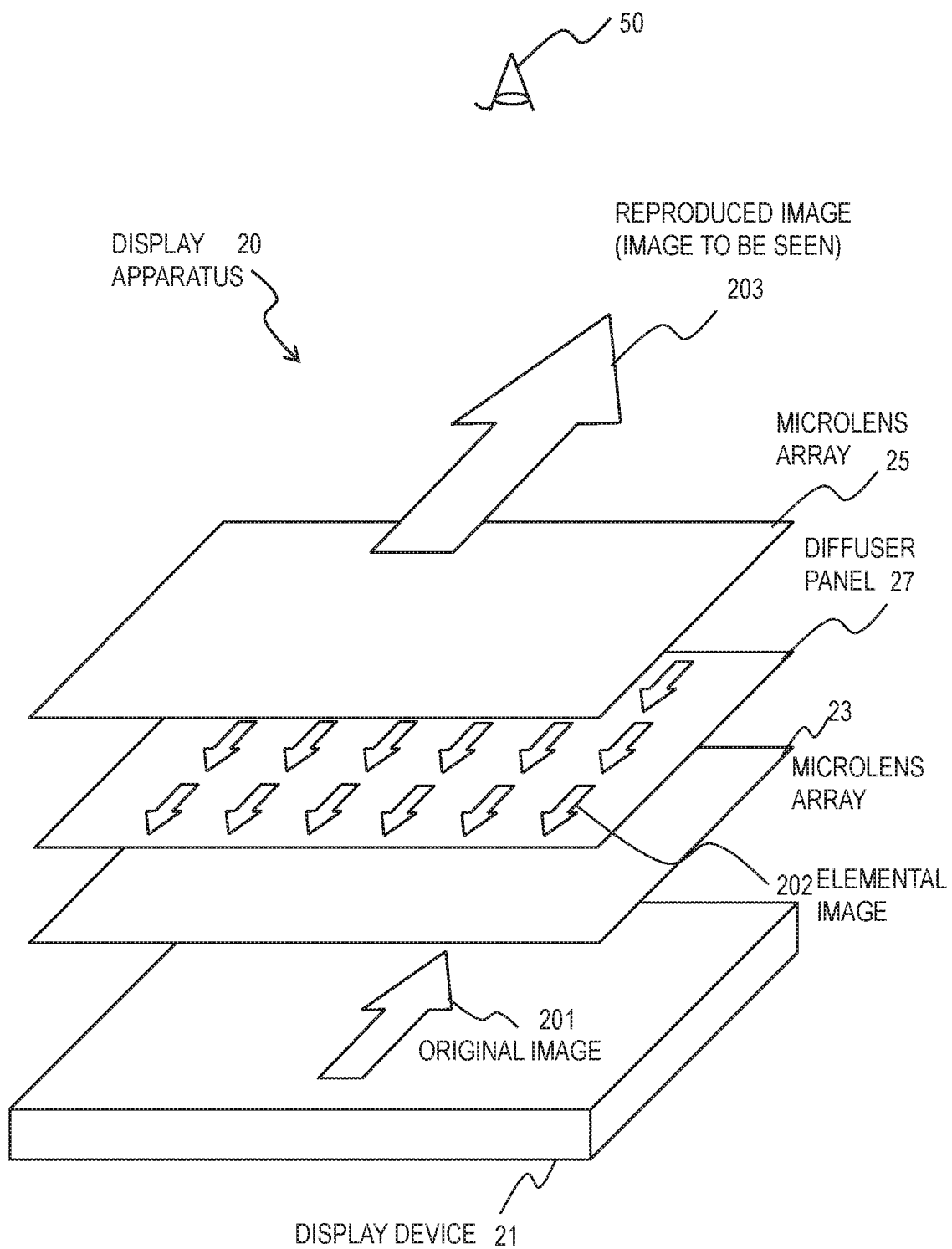
FIG. 1A is an exploded perspective diagram schematically illustrating components included in a display apparatus in Embodiment 1.

Hereinafter, embodiments are described specifically with reference to the accompanying drawings. Elements common to the drawings are denoted by the same reference signs. For clear understanding of explanation, the elements in the drawings may be exaggerated in size or shape.

Disclosed herein is a display apparatus that displays an image to be seen that is reproduced from an original image on the display at a position different from the position of the original image. The display apparatus includes a display device for displaying the original image, a first lens array, and a second lens array. The first lens array is disposed between the display device and the second lens array. The first lens array generates a plurality of elemental images from the original image to form the images between the first lens array and the second lens array. The second lens array integrates the plurality of elemental images to form one reproduced image. As a result, the reproduced image is formed at a position different from the position of the original image. Since the display device does not need to display a plurality of elemental images but need to display one original image, a high-resolution reproduced image can be generated.

Embodiment 1

FIG. 1A is an exploded perspective diagram schematically illustrating components included in a display apparatus 20 in this embodiment. The display apparatus 20 includes a display device 21, a first microlens array 23, a diffuser panel 27, and a second microlens array 25. The user 50 sees a reproduced image (image to be seen) 203 generated by the display apparatus 20. The user 50 sees the reproduced image 203 from the front of the display apparatus 20. In other words, the user side is the front of the display apparatus 20 and the opposite side is the back of the display apparatus 20.

As illustrated in FIG. 1A, the first microlens array 23 is provided in front of the display device 21, the diffuser panel 27 is provided in front of the first microlens array 23, and the second microlens array 25 is provided in front of the diffuser panel 27. The diffuser panel 27 is interposed between the first microlens array 23 and the second microlens array 25.

The display device 21 can be a liquid crystal display device or an organic light-emitting diode (OLED) display device. The display device 21 can be a display device of any type. The display device 21 includes a display panel including a plurality of pixels disposed in a matrix, a driving circuit for driving the pixels of the display panel, and a control circuit for the driving circuit, for example.

Each of the first microlens array 23 and the second microlens array 25 includes a plurality of microlenses (elemental lenses) disposed in a matrix. The microlenses can be biconvex or plano-convex lenses. The shapes of the microlenses are designed as appropriate, which can be rectangles or circles. The microlens arrays 23 and 25 can be made of resin or glass.

The first microlens array 23 is disposed distant from the display device 21. The diffuser panel 27 is disposed distant from or in contact with the first microlens array 23. The second microlens array 25 is disposed distant from or in contact with the diffuser panel 27. The second microlens array 25 is disposed distant from the first microlens array 23.

The distance between the first microlens array 23 and the front face of the display device 21 can be several centimeters to several dozen centimeters. The distance between the first microlens array 23 and the second microlens array 25 can be several millimeters to several centimeters.

For example, when seen in the direction normal to the main face of the display device 21, the first microlens array 23, the second microlens array 25, and the diffuser panel 27 cover the entire display region of the display device 21. The centers of the display region of display device 21, the first microlens array 23, and the second microlens array 25 are located at the same point when viewed in the normal direction.

The display device 21 displays an original image 201 in its display region. The first microlens array 23 generates a plurality of elemental images 202 from the original image 201. The light of the elemental images 202 is diffused by the diffuser panel 27 and enters the second microlens array 25. The second microlens array 25 integrates the plurality of elemental images 202 to generate a reproduced image 203 with a plurality of two-dimensionally disposed microlenses 251. The reproduced image 203 is an enlarged image of the original image 201; in the example of FIG. 1A, the reproduced image 203 is generated (seen) in front of the second microlens array 25.

Figure 1B:
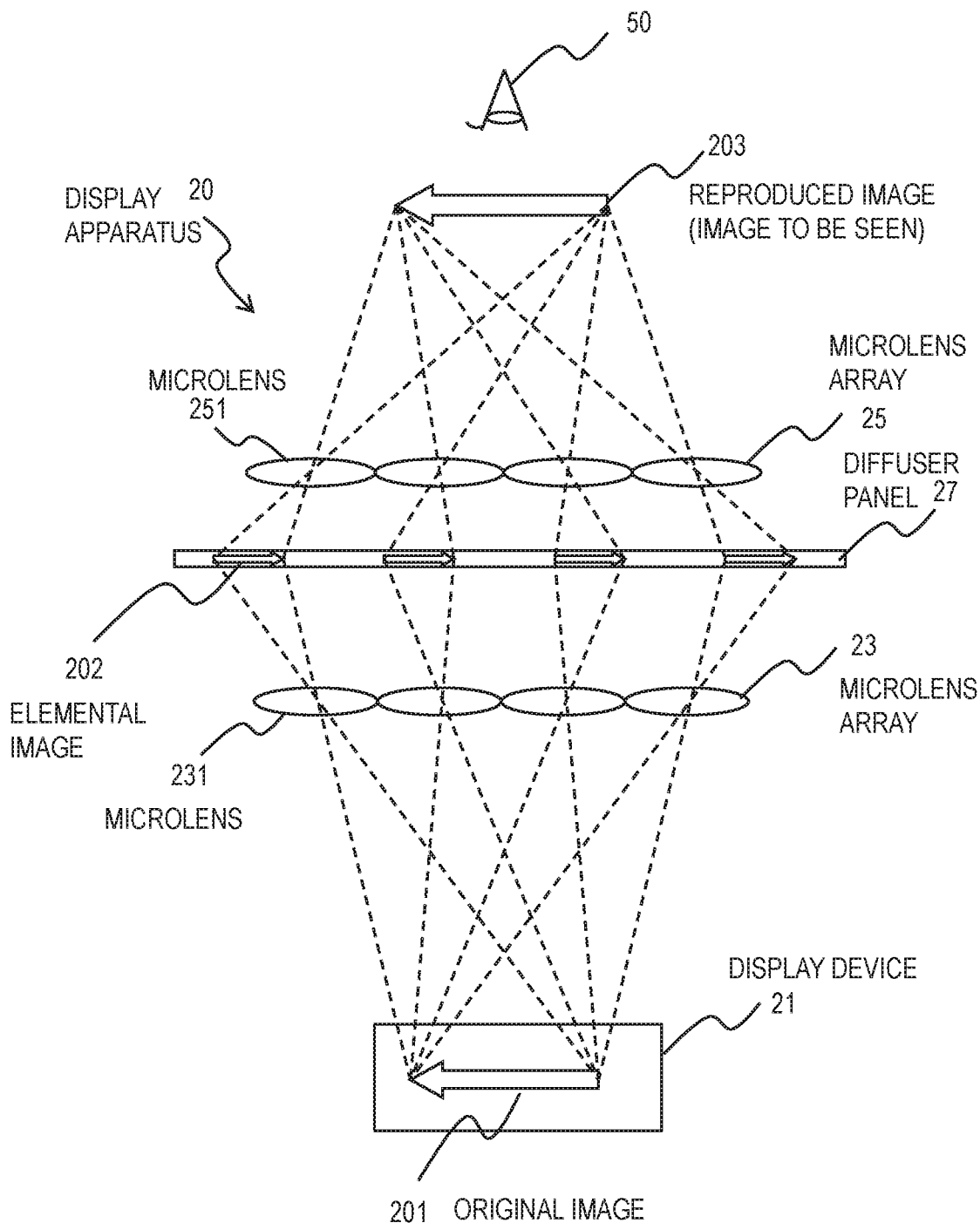
FIG. 1B is a cross-sectional diagram schematically illustrating a locational relation of the components of the display apparatus and a relation of images generated by the display apparatus in the direction normal to the principal plane of the display device in Embodiment 1.

FIG. 1B is a cross-sectional diagram schematically illustrating a locational relation of the components of the display apparatus 20 and a relation of the images generated by the display apparatus 20 in the direction normal to the principal plane of the display device 21. In FIG. 1B, the dashed lines represent principal rays of light that start from two points of the original image 201, pass through microlenses 231 and 251, and form the reproduced image 203. In the example of FIG. 1B, the microlenses 231 have the identical shapes and the microlenses 251 have the identical shapes. In FIG. 1B, only one microlens of the first microlens array 23 is indicated with a reference sign 231 and only one microlens of the second microlens array 25 is indicated with a reference sign 251 by way of example.

Each microlens 231 of the first microlens array 23 generates one elemental image 202 from the original image 201 displayed on the display device 21. The microlens 231 collects the light from each point of the original image 201 to the corresponding point of the elemental image 202. A plurality of elemental images 202 are generated between the first microlens array 23 and the second microlens array 25 to be disposed two-dimensionally within a plane like the microlenses 231.

Each elemental image 202 is a reduced image of the original image 201 and formed between the first microlens array 23 and the second microlens array 25. In the example of FIG. 1B, each elemental image 202 is formed within the diffuser panel 27. This configuration leads to a clearer reproduced image 203. The elemental image 202 may be formed outside of the diffuser panel 27, for example, in the space between the diffuser panel 27 and the first microlens array 23.

The diffuser panel 27 is a light direction control panel, and when the diffuser panel 27 is not provided, utilizes at least part of the light from the elemental images 202 that is not used for the reproduced image 203 to generate the reproduced image 203. The diffuser panel 27 increases the light to be used to generate the reproduced image 203 from the plurality of elemental images 202 to increase the luminance of the reproduced image 203. A different kind of light direction control panel other than the diffuser panel 27, such as a fiber array, can be employed.

As illustrated in FIG. 1B, the light from one elemental image 202 to form the reproduced image 203 passes through one microlens 251 associated with the elemental image 202. The diffuser panel 27 makes more light from the elemental image 202 enter the microlens 251 for transmitting the light to form the reproduced image 203, increasing the luminance of the reproduced image 203.

Although the diffuser panel 27 may decrease the light to form the reproduced image 203 that travels from a part of the elemental images 202 toward the associated microlenses 251, the diffuser panel 27 directs more light to form the reproduced image 203 from the other elemental images 202 to the associated microlenses 251. Taking the plurality of elemental images 202 as a whole, the diffuser panel 27 increases the light to form the reproduced image 203.

The diffuser panel 27 also makes it difficult for the user 50 to see the original image 201 displayed on the display device 21. In the case where the microlens arrays 23 and 25 include transparent flat non-microlens areas between microlenses, the original image 201 can be seen by the user 50 through the areas. The diffuser panel 27 interferes with the user 50 seeing the original image 201. The diffuser panel 27 can be omitted.

The second microlens array 25 integrates the elemental images 202 to generate the reproduced image 203. In the example of FIG. 1B, the reproduced image 203 is a real image formed in front of the second microlens array 25. Each microlens 251 collects light from each point of the associated elemental image 202 to the corresponding point of the reproduced image 203. The diffuser panel 27 increases the total light traveling from the elemental images 202 to the reproduced image 203 to increase the luminance of the reproduced image 203.

The above-described configuration of this embodiment generates a reproduced image 203 from a high-resolution original image 201 displayed on the display device 21 and accordingly, a high-resolution reproduced image 203 can be generated.

Embodiment 2

Figure 2A:
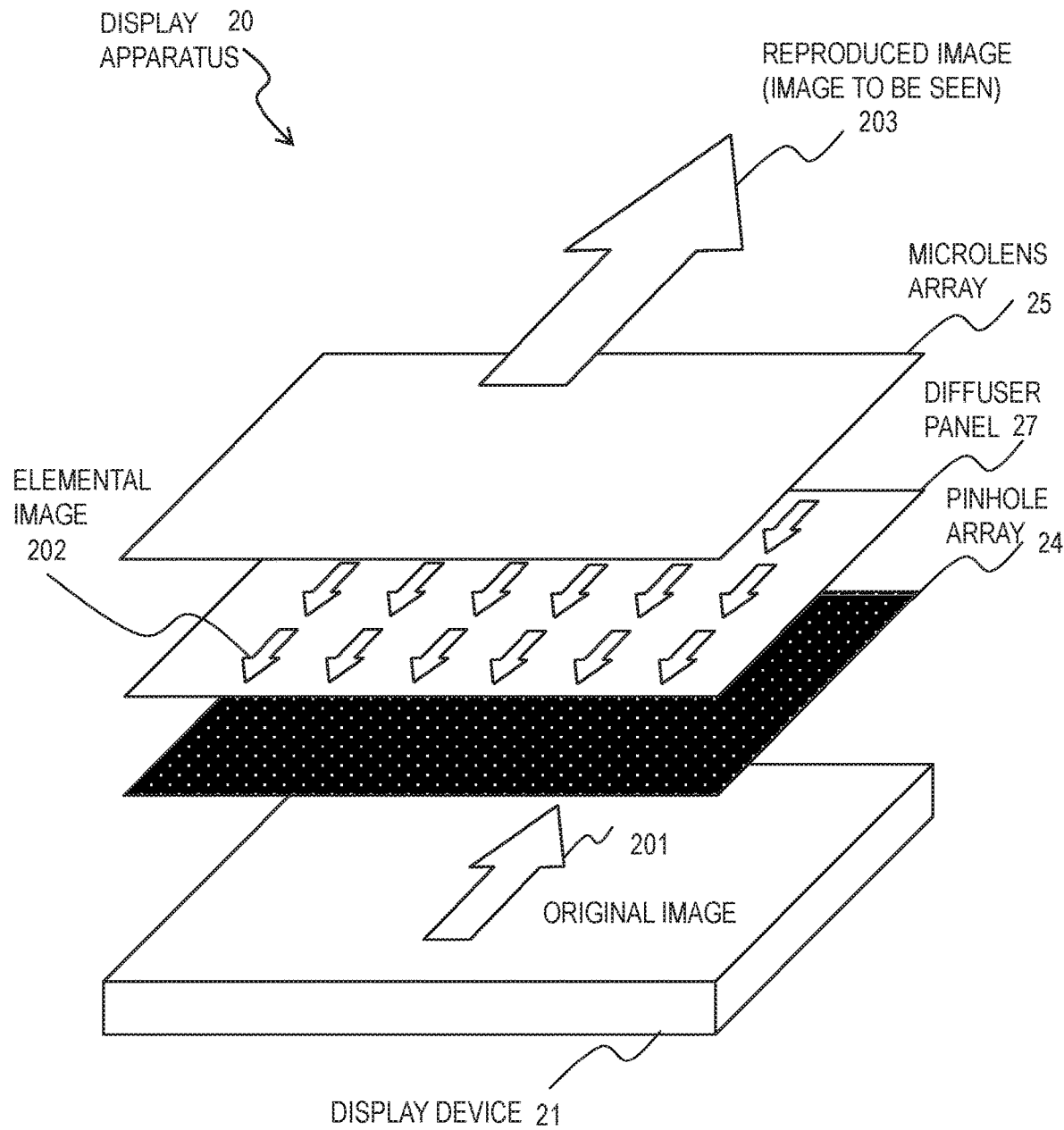
FIG. 2A is an exploded perspective diagram of another configuration example of the display apparatus in Embodiment 2.
Figure 2B:
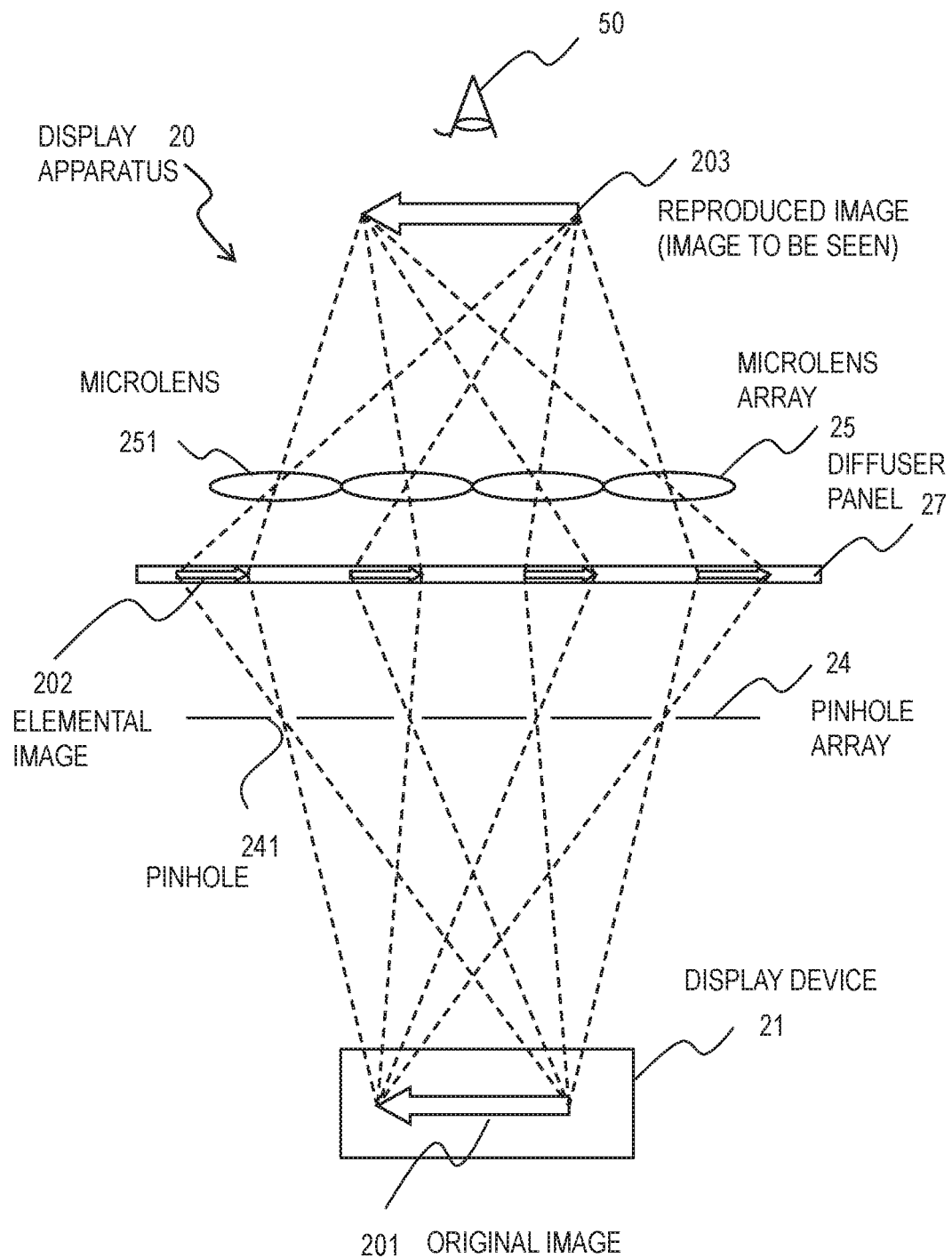
FIG. 2B is a cross-sectional diagram of the other configuration example of the display apparatus in Embodiment 2.

Hereinafter, another configuration example of the display apparatus 20 is described. Differences from Embodiment 1 are mainly described. FIGS. 2A and 2B are an exploded perspective diagram and a cross-sectional diagram, respectively, of the other configuration example of the display apparatus 20. The display apparatus 20 in this example includes a pinhole array 24 in place of the first microlens array 23 in the configuration example described with reference to FIGS. 1A and 1B. The pinhole array 24 includes pinholes 241 disposed in a matrix. In FIG. 2B, only one of the pinholes is indicated with a reference sign 241 by way of example. The locational relation of the pinhole array 24 with the other components is the same as that of the first microlens array 23.

The pinhole array 24 forms a plurality of elemental images 202 from the original image 201. One elemental image 202 is formed between the pinhole array 24 and the second microlens array 25 through one pinhole 241. In the example of FIG. 2B, the elemental images 202 are formed within the diffuser panel 27. A pinhole 241 selectively transmits only the light within a specific angle (angular range) from each point of the original image 201 to form an elemental image 202, unlike a lens that collects light.

Figure 3A:
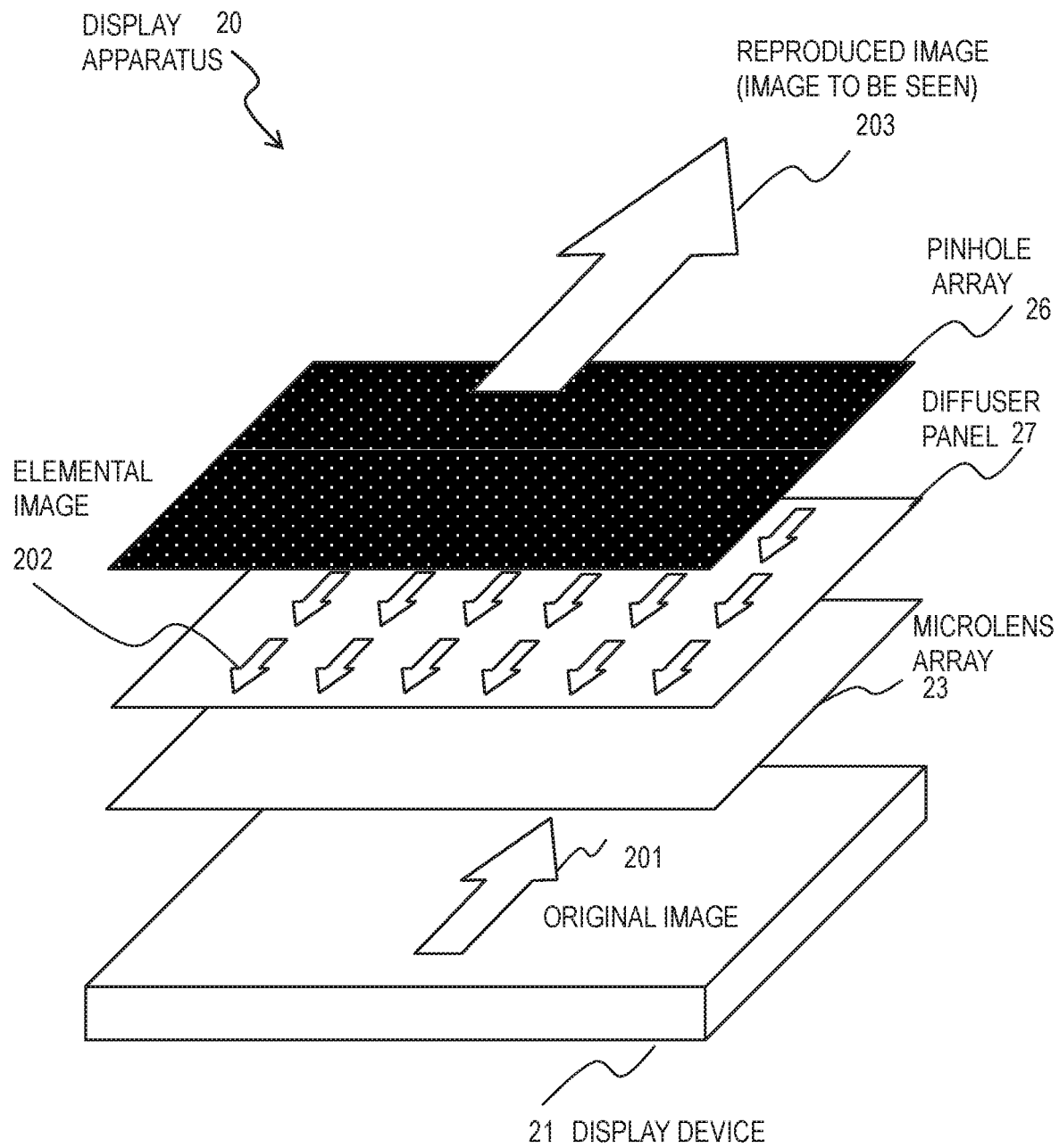
FIG. 3A is an exploded perspective diagram of still another configuration example of the display apparatus in Embodiment 2.
Figure 3B:
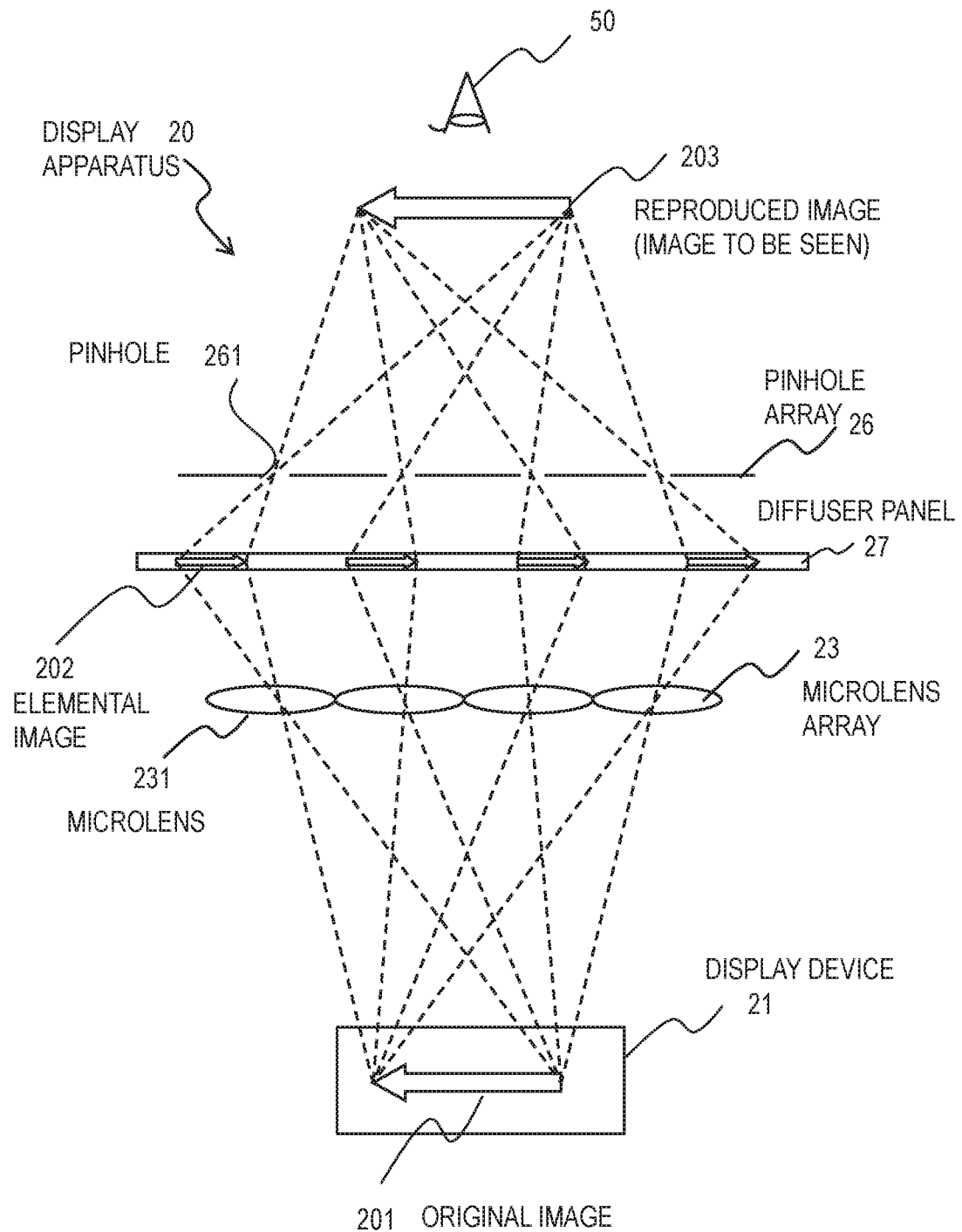
FIG. 3B is a cross-sectional diagram of the still other configuration example of the display apparatus in Embodiment 2.

FIGS. 3A and 3B are an exploded perspective diagram and a cross-sectional diagram, respectively, of still another configuration example of the display apparatus 20. The display apparatus 20 in this example includes a pinhole array 26 in place of the second microlens array 25 in the configuration example described with reference to FIGS. 1A and 1B. The pinhole array 26 includes pinholes 261 disposed in a matrix. In FIG. 3B, only one of the pinholes is indicated with a reference sign 261 by way of example. The locational relation of the pinhole array 26 with the other components is the same as that of the second microlens array 25.

The pinhole array 26 integrates a plurality of elemental images 202 to generate a reproduced image 203 in front of the pinhole array 26. One pinhole 261 transmits only the light within a specific angle (angular range) from each point of the associated elemental image 202. A reproduced image 203 of a real image is generated from the elemental images 202 through the plurality of pinholes 261.

Figure 4A:
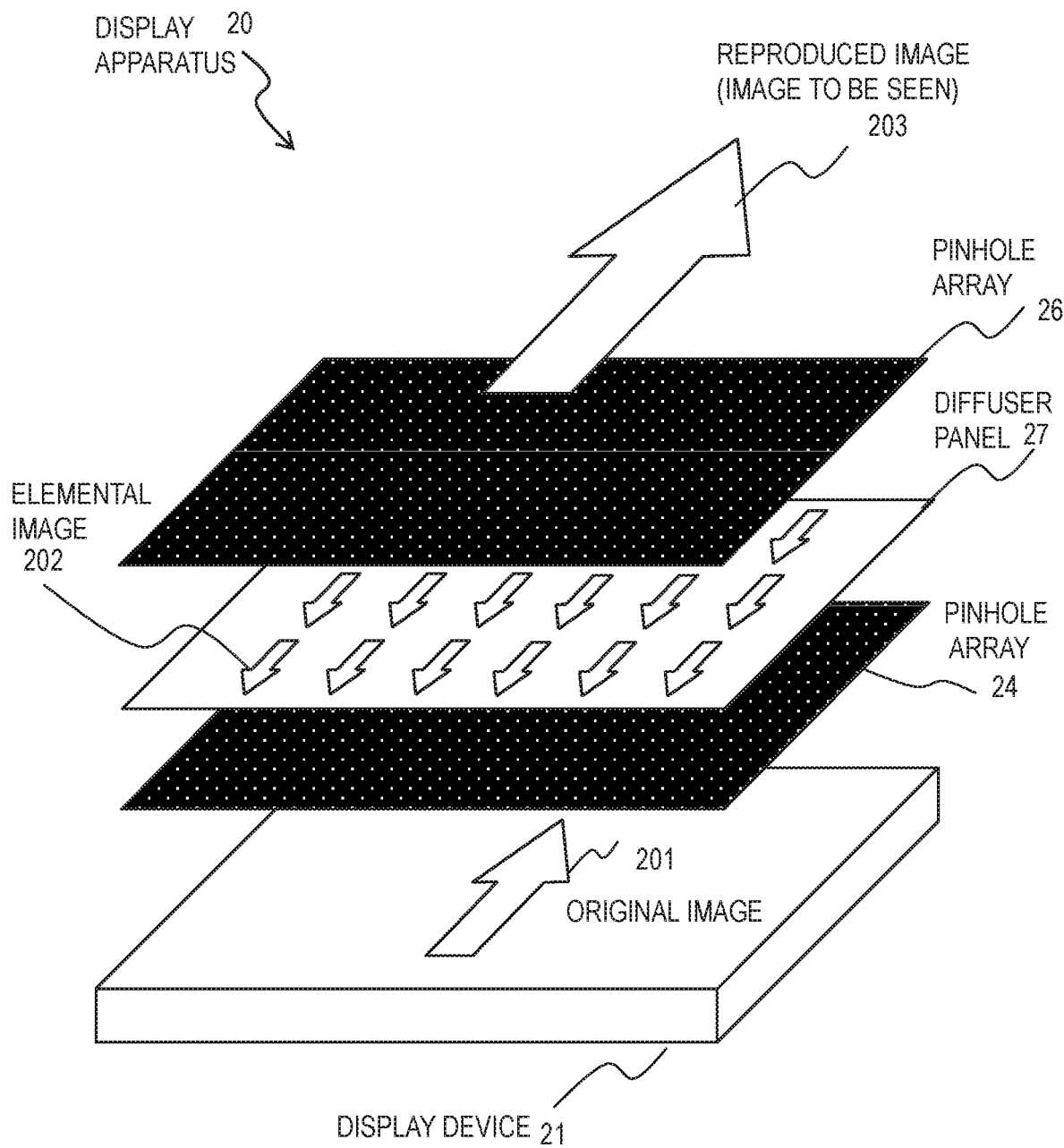
FIG. 4A is an exploded perspective diagram of still another configuration example of the display apparatus in Embodiment 2.
Figure 4B:
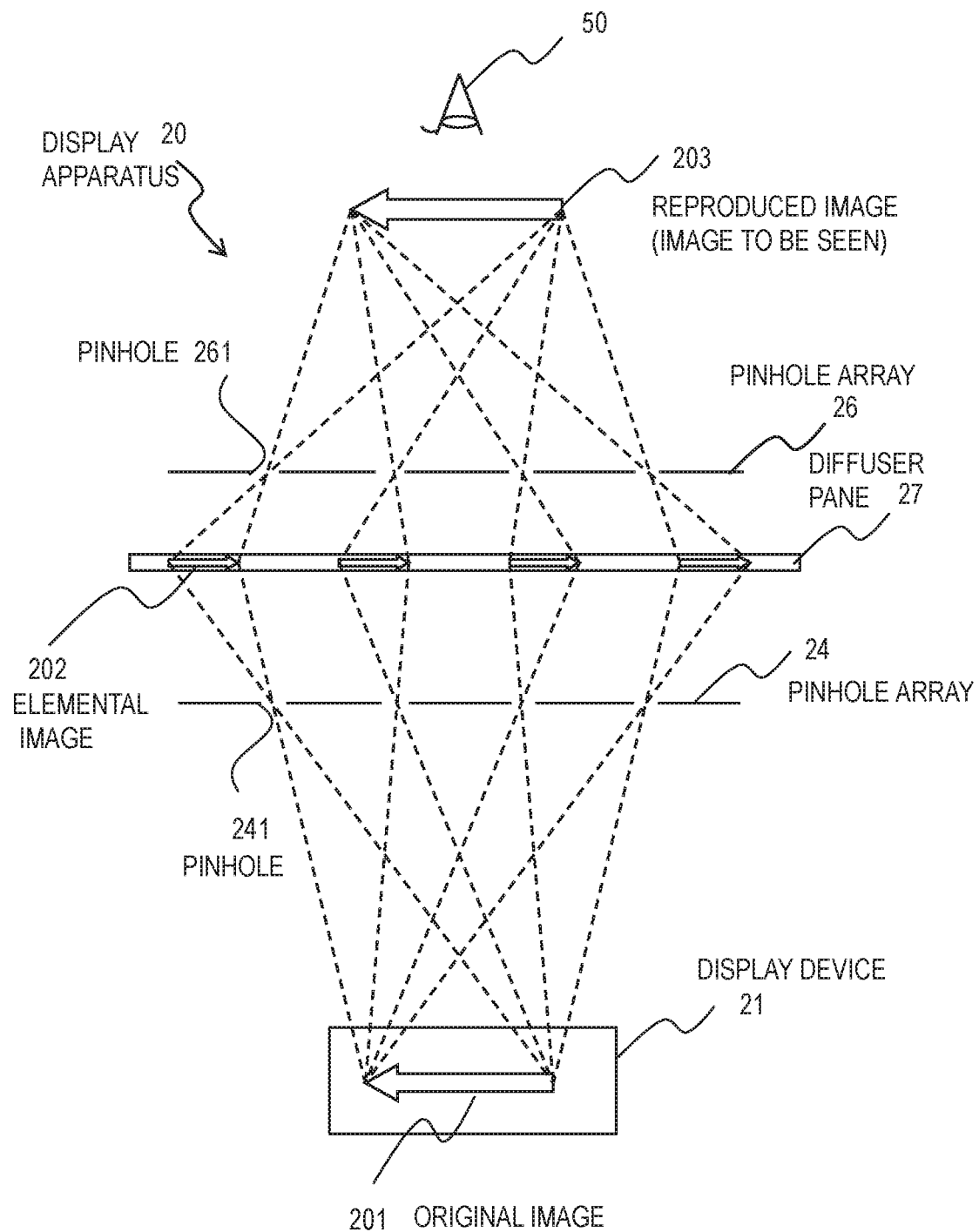
FIG. 4B is a cross-sectional diagram of the still other configuration example of the display apparatus in Embodiment 2.

FIGS. 4A and 4B are an exploded perspective diagram and a cross-sectional diagram, respectively, of still another configuration example of the display apparatus 20. The display apparatus 20 in this example includes a pinhole array 24 in place of the first microlens array 23 in the configuration example described with reference to FIGS. 1A and 1B and a pinhole array 26 in place of the second microlens array 25 in FIGS. 1A and 1B. The foregoing description is applicable to the pinhole arrays 24 and 26.

Figure 5:
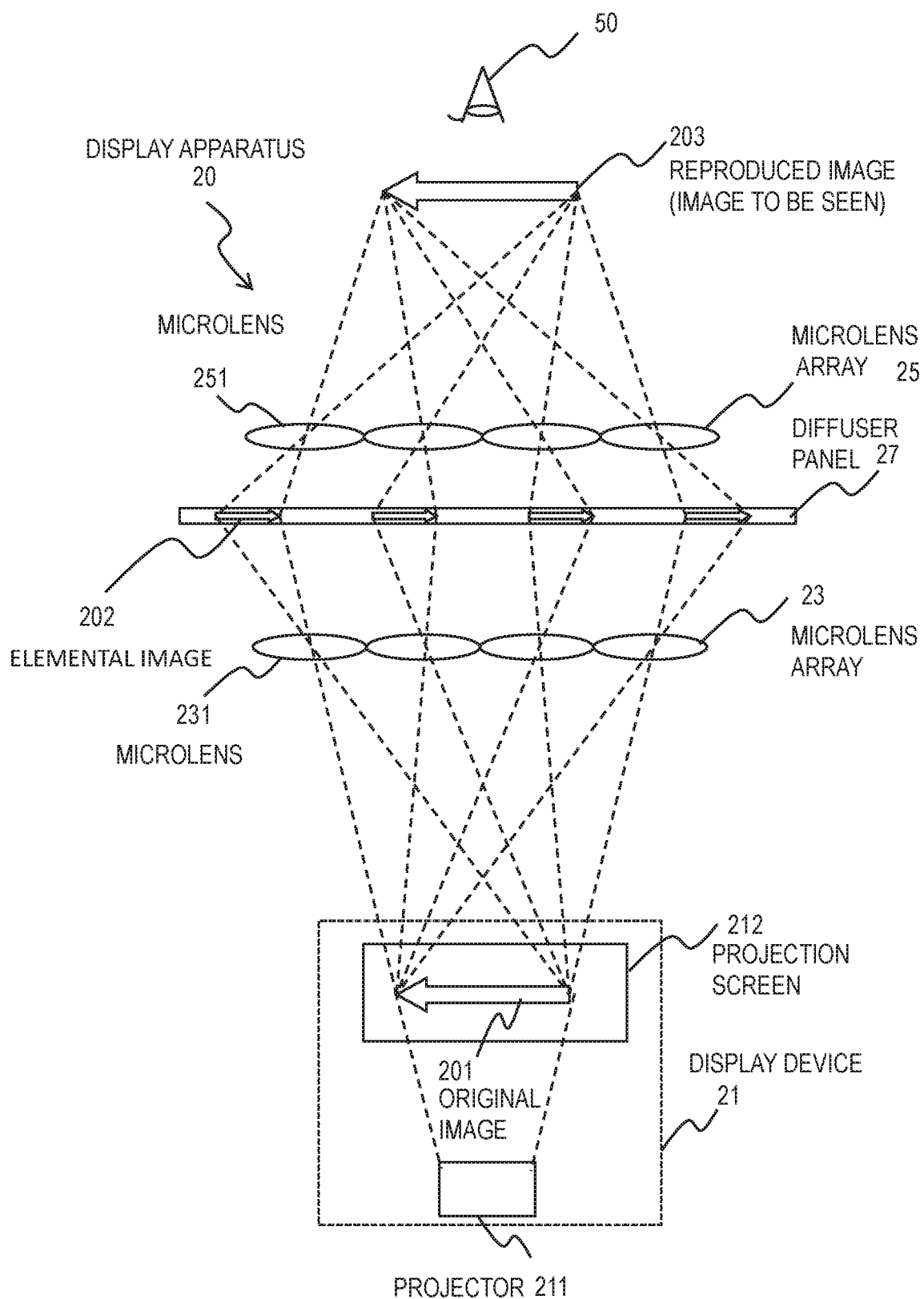
FIG. 5 is a cross-sectional diagram of still another configuration example of the display apparatus in Embodiment 2.

FIG. 5 is a cross-sectional diagram of still another configuration example of the display apparatus 20. The display device 21 of this example includes a projector 211 and a projection screen 212. The reproduced image 203 is generated from an original image 201 displayed on the projection screen 212. The description provided with reference to FIGS. 1A and 1B applies to the remaining. As noted from this example, the original image 201 can be displayed on a screen of a display device of any type.

Embodiment 3

Figure 6A:
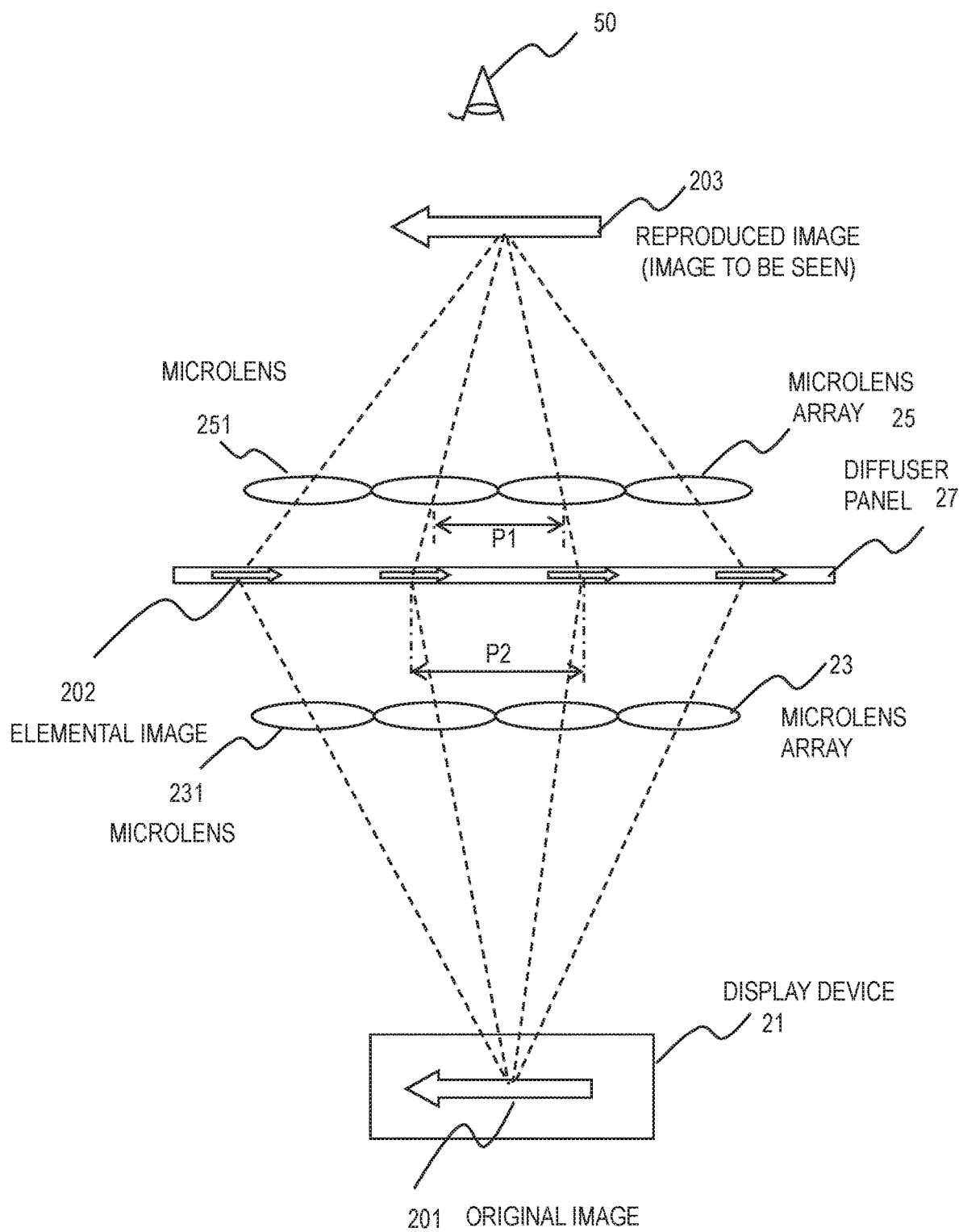
FIG. 6A is a cross-sectional diagram illustrating an example of the relation among the microlens pitch of the second microlens array, the image pitch of the elemental images, and the reproduced image in Embodiment 3.
Figure 6B:
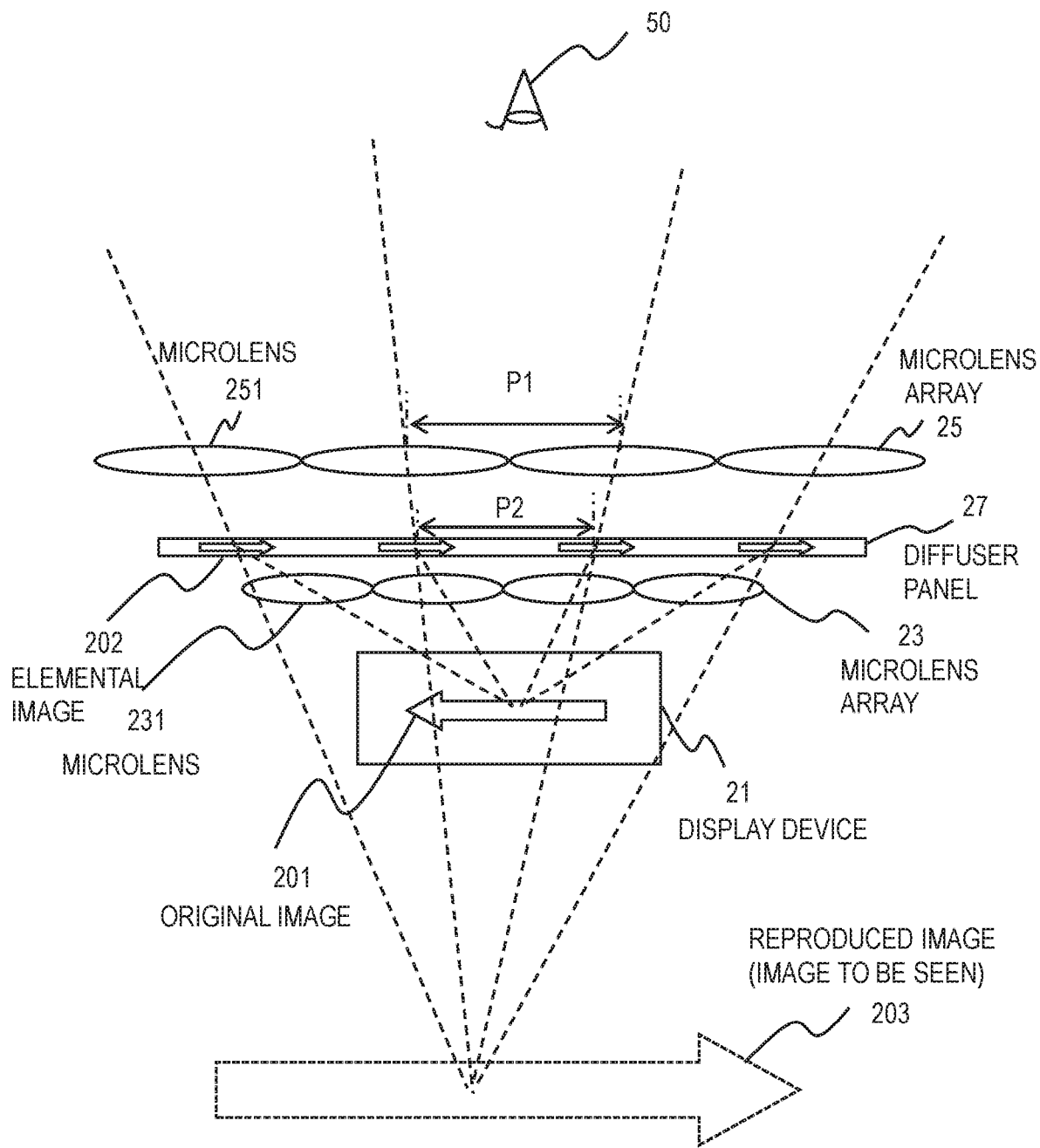
FIG. 6B is a cross-sectional diagram illustrating another example of the relation among the microlens pitch of the second microlens array, the image pitch of the elemental images, and the reproduced image in Embodiment 3.

Hereinafter, the relation among the pitch of the microlenses in the second microlens array, the pitch of the elemental images, and the reproduced image is described. FIGS. 6A and 6B are cross-sectional diagrams illustrating examples of the relation among the microlens pitch P1 of the second microlens array 25, the image pitch P2 of the elemental images 202, and the reproduced image 203. The lens pitch P1 and the image pitch P2 are uniform. The lens pitch P1 and the image pitch P2 can be varied depending on the region.

In FIG. 6A, the microlens pitch P1 of the second microlens array 25 is shorter than the image pitch P2 of the elemental images 202. The reproduced image 203 generated in this condition is a real image formed in front of the second microlens array 25. This is because the light from the corresponding points of the plurality of elemental images 202 are collected by the microlens array 25. This configuration in which the reproduced image 203 is formed in front of the display apparatus 20 provides particularly a myopic user with an image easy to see.

In the configuration of FIG. 6A, when the lens pitch P1 is increased with respect to the image pitch P2, the reproduced image 203 moves frontward and is enlarged. Conversely, when the lens pitch P1 is decreased with respect to the image pitch P2, the reproduced image 203 moves toward the second microlens array 25 and is reduced. The lens pitch P1 can be shorter than the image pitch P2 by several percent.

In FIG. 6B, the microlens pitch P1 of the second microlens array 25 is longer than the image pitch P2 of the elemental images 202. The reproduced image 203 generated in this condition is a virtual image formed behind the elemental images 202. This is because the light from the corresponding points of the plurality of elemental images 202 diffuses after passing through the microlens array 25. This configuration in which the reproduced image 203 is formed behind the display device 21 provides particularly a hyperopic user with an image easy to see.

In the configuration of FIG. 6B, when the lens pitch P1 is increased with respect to the image pitch P2, the reproduced image 203 moves frontward to get closer to the elemental images 202 and is reduced. Conversely, when the lens pitch P1 is decreased with respect to the image pitch P2, the reproduced image 203 moves backward to get away from the elemental images 202 and is enlarged. The lens pitch P1 can be longer than the image pitch P2 by several percent.

As understood from the above, the position and the scale of the reproduced image 203 to be seen (generated) depend on the relation between the lens pitch P1 of the second microlens array 25 and the image pitch P2 of the elemental images 202. The image pitch P2 of the elemental images 202 depends on the lens pitch of the first microlens array 23. Accordingly, the position and the scale of the reproduced image 203 to be seen can be changed by changing the lens pitch of the second microlens array 25 and/or the lens pitch of the first microlens array 23.

The image pitch P2 of the elemental images 202 also depends on the distance between the original image 201 and the first microlens array 23 and the focal distance of the first microlens array 23. The lens pitch of the first microlens array 23 and the lens pitch of the second microlens array 25 can be the same or different.

Figure 7A:
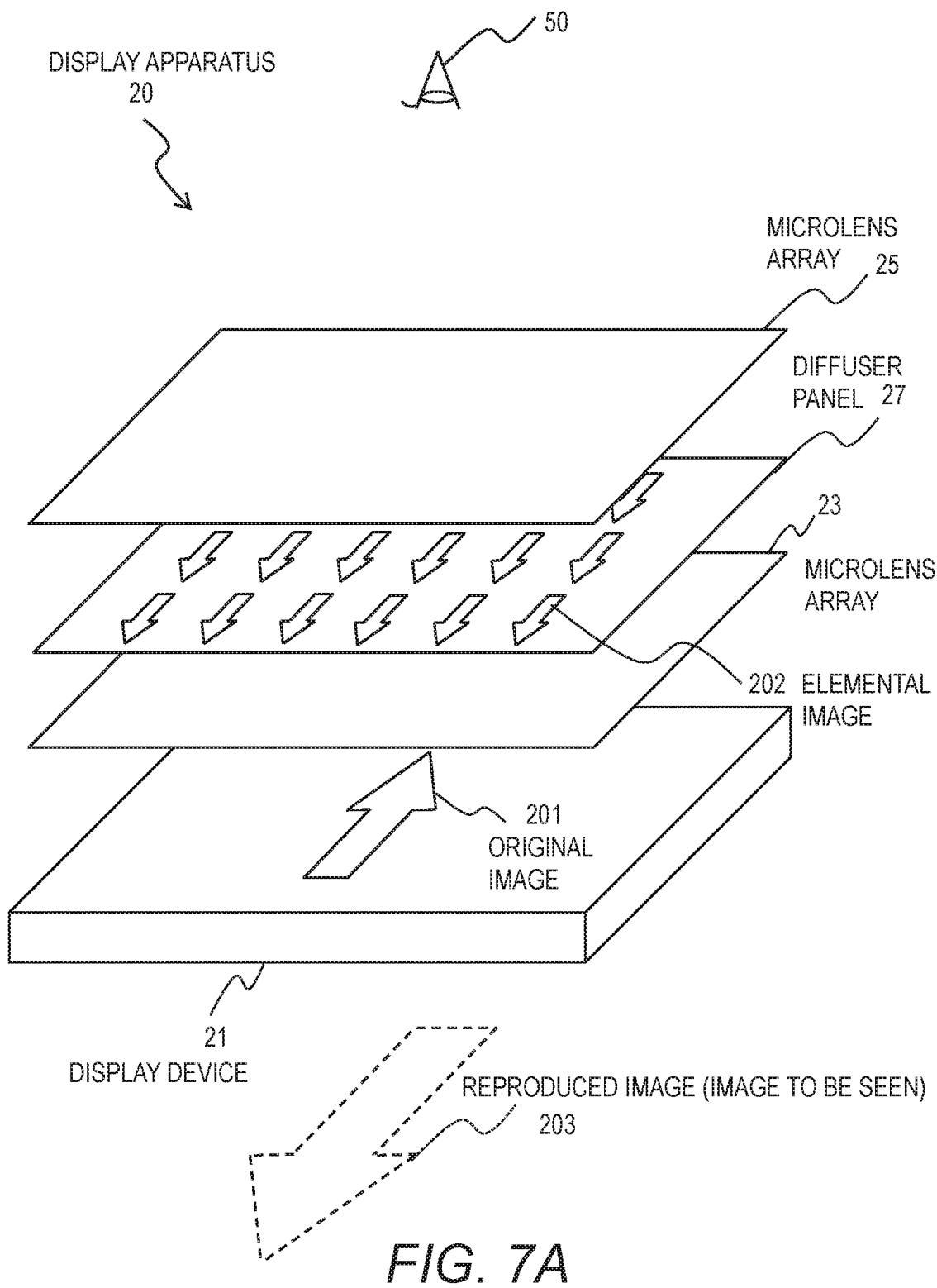
FIG. 7A is an exploded perspective diagram of a configuration example to reproduce a virtual image behind the display apparatus in Embodiment 3.
Figure 7B:
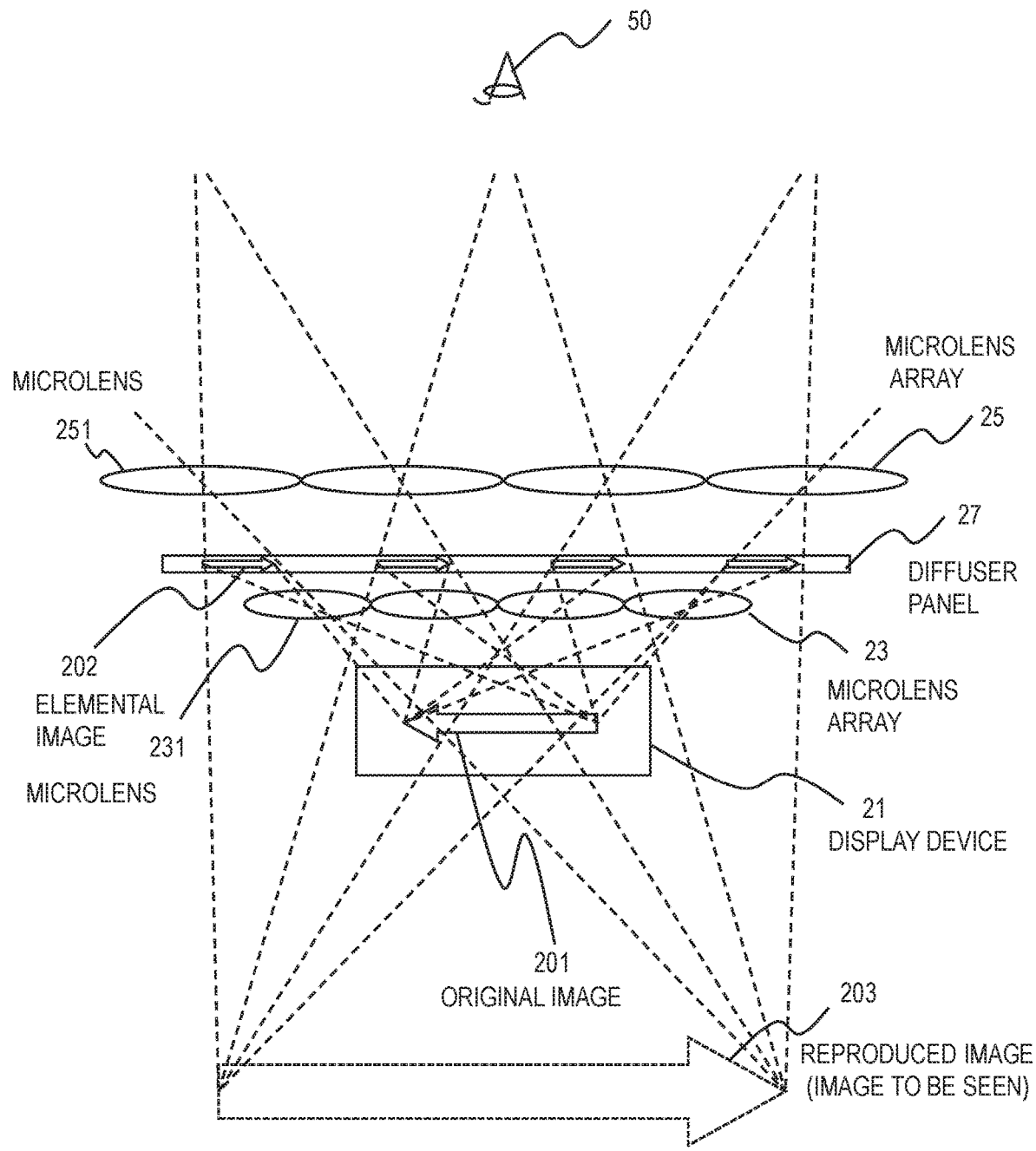
FIG. 7B is a cross-sectional diagram of the configuration example to reproduce a virtual image behind the display device in Embodiment 3.

A configuration example to reproduce a virtual image behind the display device is described. Differences from Embodiment 1 are mainly described. FIGS. 7A and 7B are an exploded perspective diagram and a cross-sectional diagram, respectively, of a configuration example to reproduce a virtual image behind the display device. The difference from Embodiment 1 is in the relation between the length of the lens pitch of the second microlens array 25 and the length of the image pitch of the elemental images 202.

In the configuration of Embodiment 1, the lens pitch of the second microlens array 25 is shorter than the image pitch of the elemental images 202. In the configuration example in FIGS. 7A and 7B, the lens pitch of the second microlens array 25 is longer than the image pitch of the elemental images 202. In the configuration where the lens pitch of the second microlens array 25 is shorter than the image pitch of the elemental images 202, the reproduced image 203 is formed in front of the second microlens array 25, as described with reference to FIG. 6A.

In contrast, in the configuration where the lens pitch of the second microlens array 25 is longer than the image pitch of the elemental images 202, the reproduced image 203 is formed behind the elemental images 202 as a virtual image, as described with reference to FIG. 6B.

Embodiment 4

Hereinafter, a configuration in which a liquid crystal microlens array is used as a microlens array is described. When a potential is applied to a liquid crystal layer, the liquid crystal therein is oriented. A refractive-index distribution is generated in accordance with the orientation of the liquid crystal, providing the liquid crystal layer with characteristics of a gradient index lens.

The liquid crystal microlens array can be used as the first microlens array 23 and/or the second microlens array 25. Since the liquid crystal microlens array can be electrically controlled in lens pitch, the display apparatus can easily generate a reproduced image at an appropriate position depending on the user.

Configuration of Display Apparatus

Figure 8:
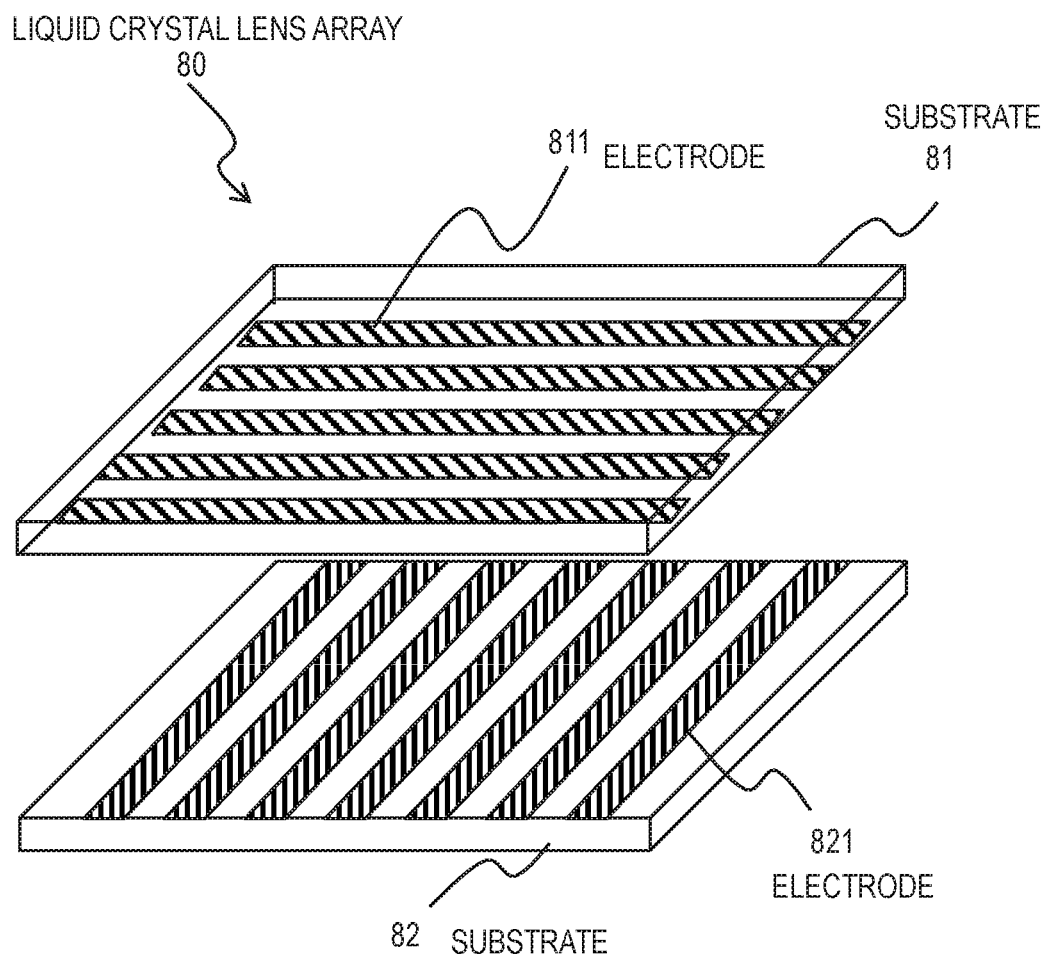
FIG. 8 is an exploded perspective diagram illustrating a configuration example of a liquid crystal lens array in Embodiment 4.

FIG. 8 is an exploded perspective diagram illustrating a configuration example of a liquid crystal lens array 80. The liquid crystal lens array 80 includes a first substrate 81 on the front and a second substrate 82 on the back. The first substrate 81 and the second substrate 82 are insulative transparent substrates. Liquid crystal material (not shown) is encapsulated between the first substrate 81 and the second substrate 82 opposed to each other.

A plurality of electrodes are disposed on the faces of the first substrate 81 and the second substrate 82 opposed to each other. On the face of the first substrate 81 facing the liquid crystal material, a plurality of strip-like electrodes 811 are disposed. On the face of the second substrate 82 facing the liquid crystal material, a plurality of strip-like electrodes 821 are disposed. The electrodes 811 and 821 are made of transparent conductive material, such as indium tin oxide (ITO) or zinc oxide (ZnO).

The plurality of strip-like electrodes 811 are disposed to extend in the same direction and to be distant from one another in the direction perpendicular to the direction. The plurality of strip-like electrodes 821 are disposed to extend in the same direction and to be distant from one another in the direction perpendicular to the direction. The first substrate 81 and the second substrate 82 are fixed in such an orientation that the electrodes 811 cross the electrodes 812 when seen in the direction normal to the main faces of the substrates (in the planar view). In the example described in the following, the angle between the direction in which the electrodes 811 extend and the direction in which the electrodes 812 extend is the right angle in the planar view.

Figure 9A:
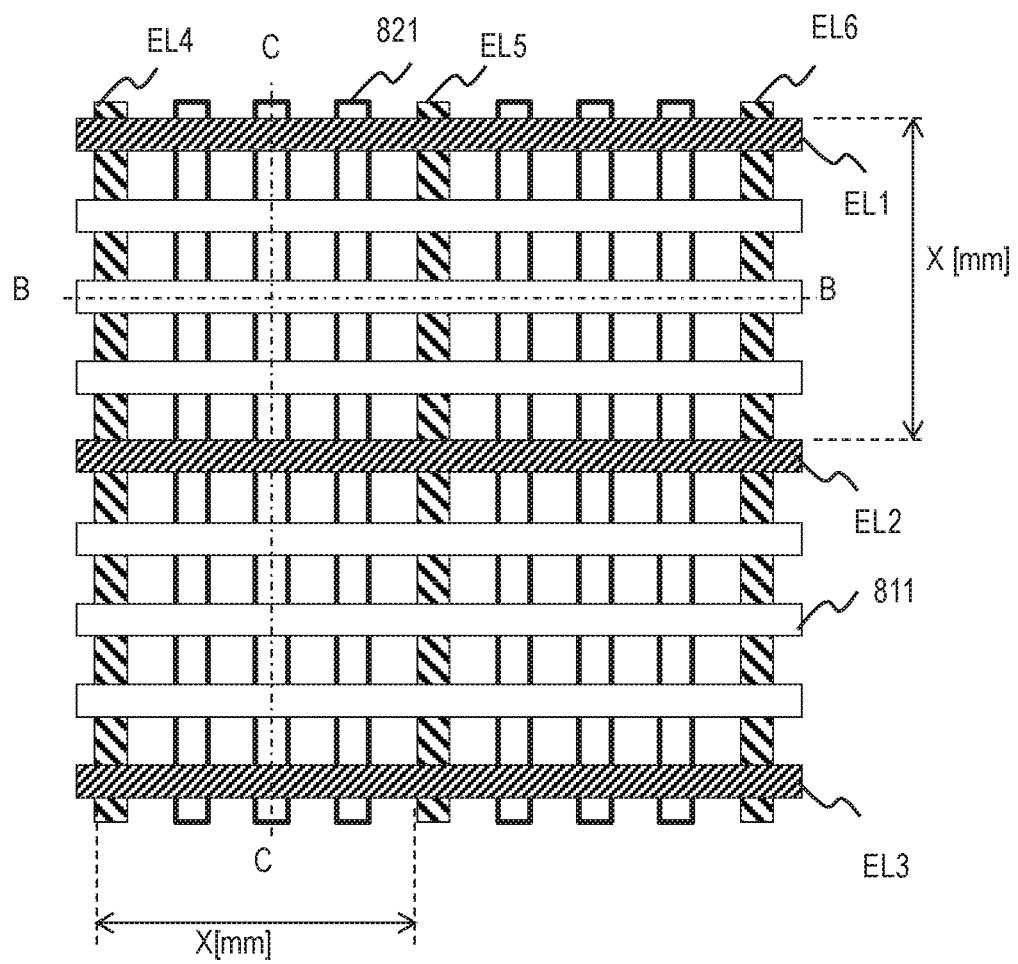
FIG. 9A is a plan diagram illustrating a layout of electrodes of the liquid crystal lens array and the voltages to be applied to the electrodes in Embodiment 4.

FIG. 9A is a plan diagram illustrating a layout of the electrodes 811 and 821 and the voltages to be applied to the electrodes. In FIG. 9A, the electrodes EL1, EL2, and EL3 are electrodes 811 provided on the first substrate 81. The electrodes EL4, EL5, and EL6 are electrodes 821 provided on the second substrate 82. Not-shown driving circuits drive the electrodes 811 and 821 to control the potentials of the electrodes.

The electrodes 811 are disposed in a stripe pattern. The electrodes 811 are disposed to extend in the horizontal direction and to be distant from one another in the vertical direction in FIG. 9A. The electrodes 811 have identical shapes and they are arrayed at equal intervals in the vertical direction. The electrodes 821 are disposed in a stripe pattern. The electrodes 821 are disposed to extend in the vertical direction and to be distant from one another in the horizontal direction in FIG. 9A. The electrodes 821 have identical shapes and they are arrayed at equal intervals in the horizontal direction.

The electrodes 811 cross the electrodes 821 in the planar view and the electrodes 811 are orthogonal to the electrodes 821 in the example of FIG. 9A. The electrodes 811 have the shapes identical to the shapes of electrodes 821 and the array pitch of the electrodes 811 is the same as the array pitch of the electrodes 821. The shapes and/or the pitch of the electrodes 811 can be different from the shapes and/or the pitch of the electrodes 821. The electrodes 811 do not need to be orthogonal to the electrodes 821.

The electrodes EL1, EL2, and EL3 at every X mm among the electrodes 811 on the first substrate 81 are grounded and provided with 0 V. The other electrodes 811 are in a floating state. The electrodes EL4, EL5, and EL6 at every X mm among the electrodes 821 on the second substrate 82 are provided with a positive voltage of V1 V. The other electrodes 821 are in a floating state.

Figure 9B:
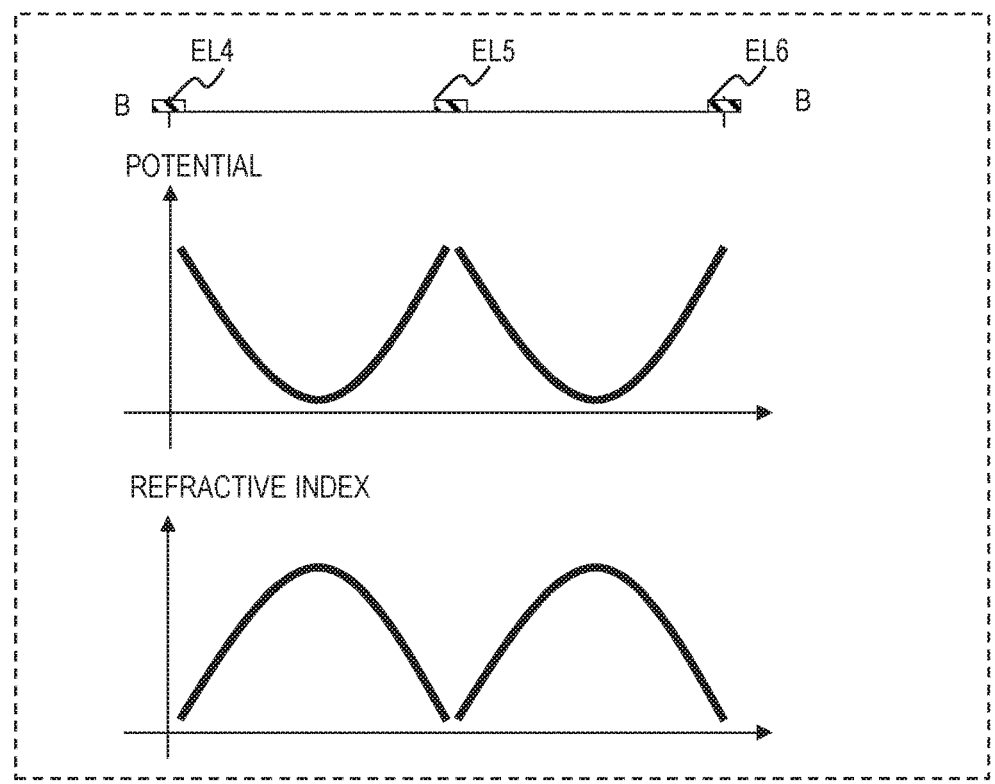
FIG. 9B illustrates a potential distribution and a refractive-index distribution in the cross-section cut along the line B-B in FIG. 9A in Embodiment 4.
Figure 9C:
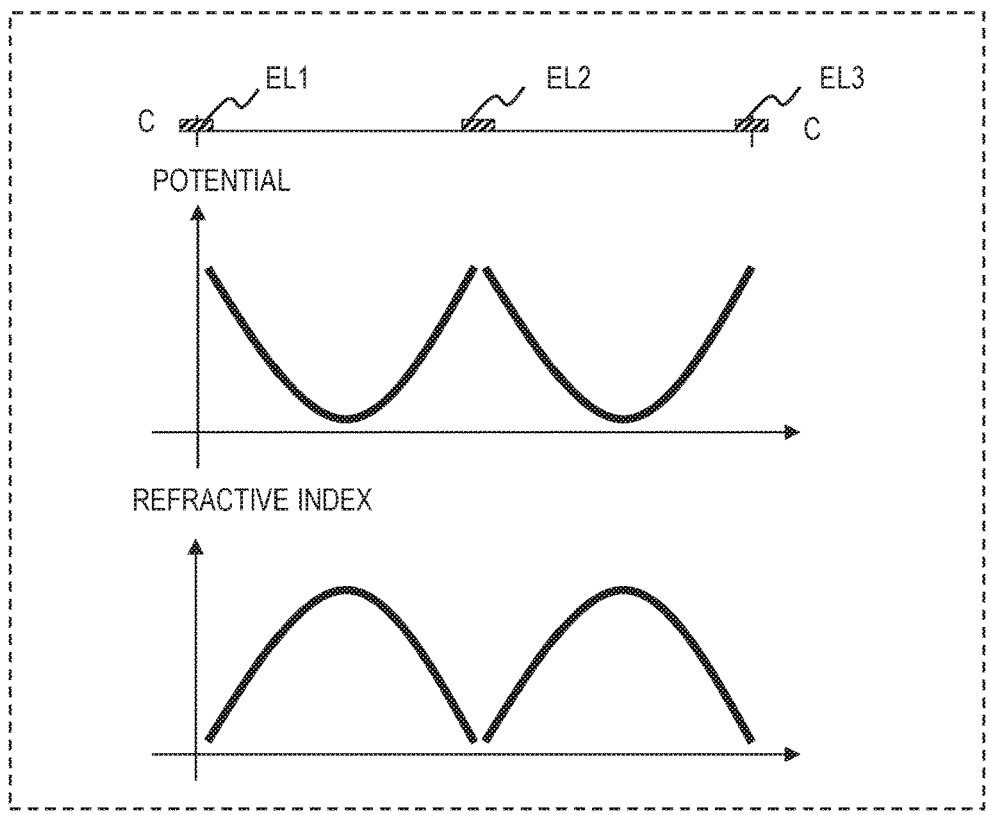
FIG. 9C illustrates a potential distribution and a refractive-index distribution in the cross-section cut along the line C-C in FIG. 9A in Embodiment 4.

FIG. 9B illustrates a potential distribution and a refractive-index distribution in the cross-section cut along the line B-B in FIG. 9A. FIG. 9C illustrates a potential distribution and a refractive-index distribution in the cross-section cut along the line C-C in FIG. 9A. As illustrated in FIG. 9B, the refractive index takes the lowest value at the points of the electrodes EL4, EL5, and EL6, gradually increases toward the midpoint between the electrodes EL4 and EL5 and the midpoint between the electrodes EL5 and EL6, and takes the highest value at the midpoints.

As illustrated in FIG. 9C, the refractive index takes the lowest value at the points of the electrodes EL1, EL2, and EL3, gradually increases toward the midpoint between the electrodes EL1 and EL2 and the midpoint between the electrodes EL2 and EL3, and takes the highest value at the midpoints.

Within an area defined by two adjacent electrodes provided with 0 V and two adjacent electrodes provided with V1 V, the liquid crystal material acts on the light transmitted therethrough as a substantially circular convex lens. In other words, a gradient-index lens array composed of gradient-index lenses having a diameter and a pitch of X mm is provided.

Specifically, a gradient-index lens is formed in each of the area surrounded by the electrodes EL1, EL2, EL4, and EL5 and the area surrounded by the electrodes EL1, EL2, EL5, and EL6. Furthermore, a gradient-index lens is formed in each of the area surrounded by the electrodes EL2, EL3, EL4, and EL5 and the area surrounded by the electrodes EL2, EL3, EL5, and EL6.

The lens pitch can be increased or decreased by increasing or decreasing the interval between electrodes to be provided with 0 V and the interval between electrodes to be provided with V1 V. As an alternative, the electrodes 811 on the first substrate 81 can be provided with V1 V and the electrodes 821 on the second substrate 82 can be provided with 0 V. As far as the potential distributions as illustrated in FIGS. 9B and 9C are generated, the potential to be applied to the electrodes on one of the substrates can be a predetermined voltage different from 0 V but lower than the voltage V1 and the polarities of the potentials to be applied to the two substrates can be chosen freely. The voltage V1 can be a negative voltage.

Figure 10:
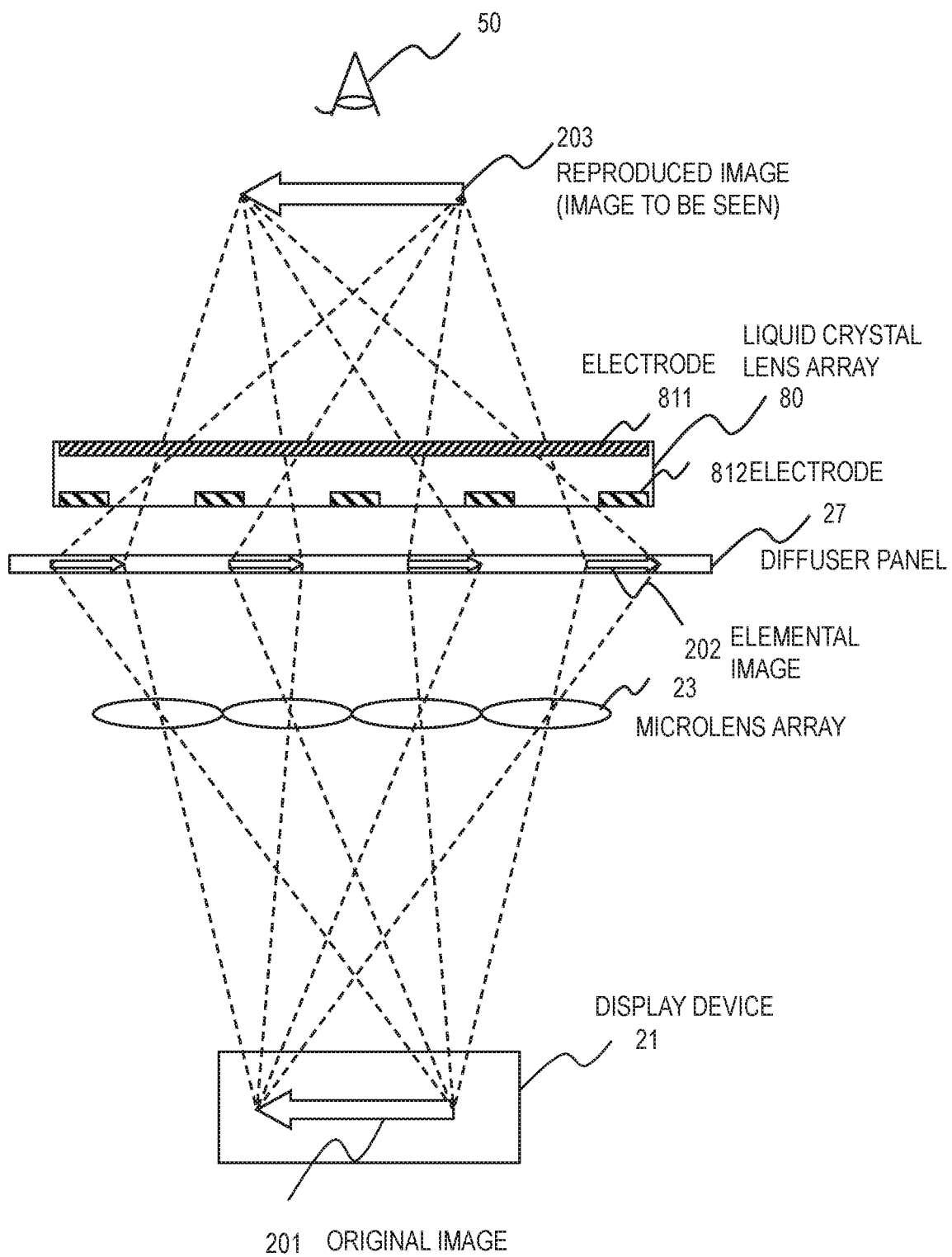
FIG. 10 illustrates a configuration example of a display apparatus in which a liquid crystal lens array is employed as the second microlens array in Embodiment 4.

FIG. 10 illustrates a configuration example of a display apparatus 20 in which a liquid crystal lens array 80 is employed as the second microlens array. The description about the second microlens array 25 in Embodiment 1 is applicable to the liquid crystal lens array 80. The liquid crystal lens array 80 is driven as described above and its lens pitch of X mm is shorter than the image pitch of the elemental images 202.

The display position of the reproduced image 203 can be changed by changing the lens pitch. Assume that the width of the strip-like electrodes 811 and 821 is 0.02 mm, the pitch of the electrodes is 0.04 mm, the pitch of the elemental images 202 projected on the diffuser panel 27 is 1.00 mm, for example. When the liquid crystal lens array 80 is driven to have a lens pitch X of 0.96 mm, the reproduced image 203 is seen in front of the diffuser panel 27. When the liquid crystal lens array 80 is driven to have a lens pitch X of 1.04 mm, the reproduced image 203 is seen behind the diffuser panel 27.

Figure 11A:
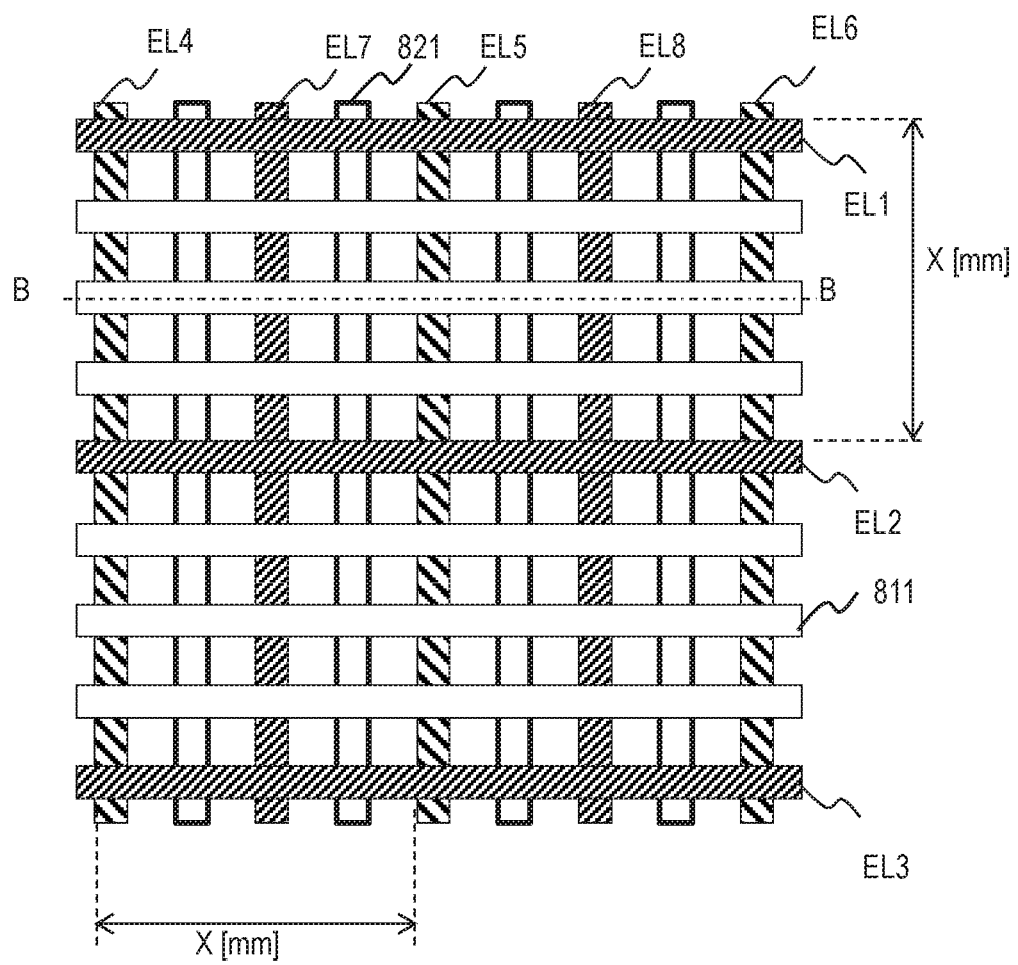
FIG. 11A is a plan diagram illustrating a layout of electrodes of the liquid crystal lens array and the voltages to be applied to the electrodes in Embodiment 4.

Next, another example of driving the liquid crystal lens array 80 is described. FIG. 11A is a plan diagram illustrating a layout of the electrodes 811 and 821 and the voltages to be applied to the electrodes. The electrodes EL1, EL2, and EL3 at every X mm among the electrodes 811 on the first substrate 81 are grounded and provided with 0 V. The other electrodes 811 are in a floating state.

The electrodes EL4, EL5, and EL6 at every X mm among the electrodes 821 on the second substrate 82 are provided with a positive voltage of V1 V. The electrodes EL7 and EL8 at the middle between electrodes provided with V1 V among the electrodes 821 on the second substrate 82 are grounded and provided with 0 V. The other electrodes 821 are in a floating state. Compared to the driving method described with reference to FIGS. 9A, 9B, and 9C, the voltages for the electrodes EL7 and EL8 are different. The remaining is the same as the above-described driving method.

Figure 11B:
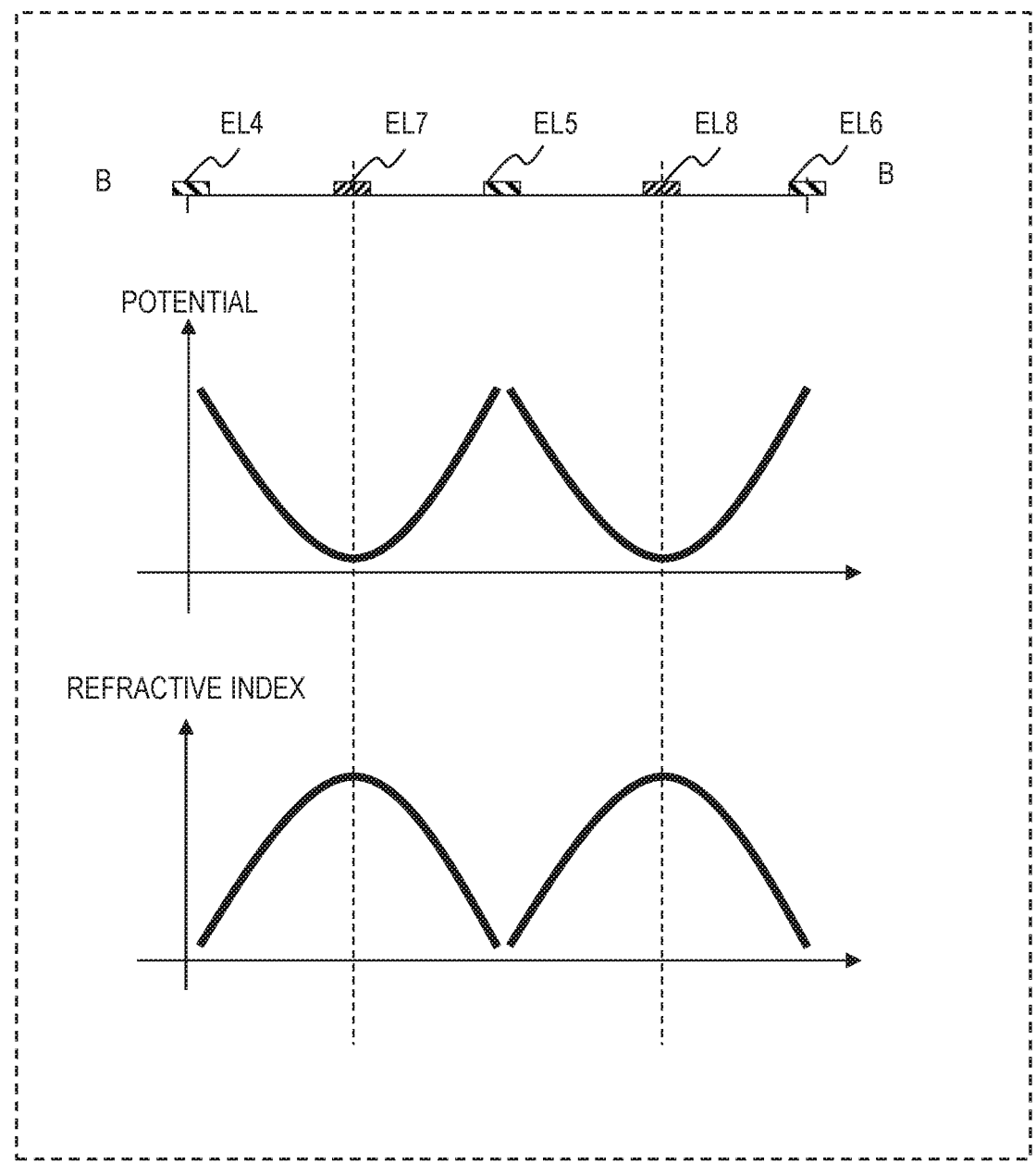
FIG. 11B illustrates a potential distribution and a refractive-index distribution in the cross-section cut along the line B-B in FIG. 11A in Embodiment 4.

FIG. 11B illustrates a potential distribution and a refractive-index distribution in the cross-section cut along the line B-B in FIG. 11A. The description provided with reference to FIG. 9C applies to this driving method. Like the first driving method, the liquid crystal lens array 80 works as a gradient-index lens array composed of gradient-index lenses having a diameter and a lens pitch of X mm. Furthermore, providing the electrodes EL7 and EL8 with 0 V accurately determines the peak points of the low potential and accordingly, the optical axes of the lenses can be determined precisely, compared to the first driving method. The voltage to be applied to the electrodes EL1, EL2, EL3, EL7, and EL8 can be a predetermined voltage different from 0 V but lower than the voltage V1 V.

Figure 12:
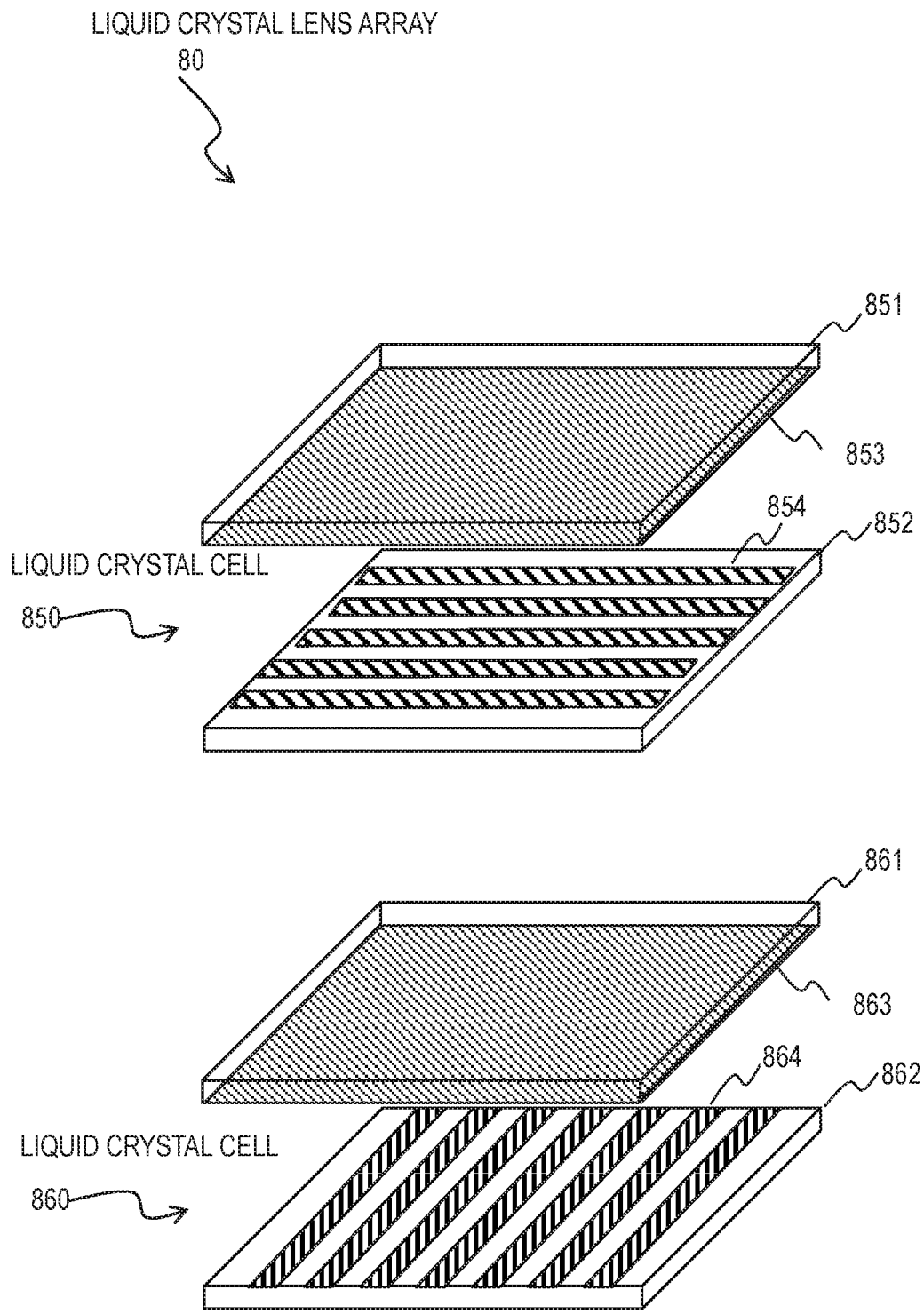
FIG. 12 is an exploded perspective diagram of another configuration example of the liquid crystal lens array in Embodiment 4.

Next, another configuration example of the liquid crystal lens array 80 is described. FIG. 12 is an exploded perspective diagram of the other configuration example of the liquid crystal lens array 80. The liquid crystal lens array 80 includes a first liquid crystal cell 850 on the front and a second liquid crystal cell 860 on the back.

The first liquid crystal cell 850 includes a first substrate 851 and a second substrate 852. The first substrate 851 and the second substrate 852 are insulative transparent substrates. Liquid crystal material (not shown) is encapsulated between the first substrate 851 and the second substrate 852 opposed to each other. A planar electrode 853 is provided on the face of the first substrate 851 facing the second substrate 852 and the liquid crystal material. A plurality electrodes 854 in a stripe pattern are provided on the face of the second substrate 852 facing the first substrate 851 and the liquid crystal material.

The plurality of strip-like electrodes 854 are disposed to extend in the same direction and to be distant from one another in the direction perpendicular to the direction on the second substrate 852. All the plurality of electrodes 854 face the planar electrode 853. The electrodes 853 and 854 are made of transparent conductive material, such as indium tin oxide (ITO) or zinc oxide (ZnO).

The second liquid crystal cell 860 includes a first substrate 861 and a second substrate 862. The first substrate 861 and the second substrate 862 are insulative transparent substrates. Liquid crystal material (not shown) is encapsulated between the first substrate 861 and the second substrate 862 opposed to each other. A planar electrode 863 is provided on the face of the first substrate 861 facing the second substrate 862 and the liquid crystal material. A plurality electrodes 864 in a stripe pattern are provided on the face of the second substrate 862 facing the first substrate 861 and the liquid crystal material.

The plurality of strip-like electrodes 864 are disposed to extend in the same direction and to be distant from one another in the direction perpendicular to the direction on the second substrate 862. All the plurality of electrodes 864 face the planar electrode 863. The electrodes 863 and 864 are made of transparent conductive material, such as indium tin oxide (ITO) or zinc oxide (ZnO).

The first liquid crystal cell 850 and the second liquid crystal cell 860 are stacked and fixed in such an orientation that the electrodes 854 in the stripe pattern of the first liquid crystal cell 850 are orthogonal to the electrodes 864 in the stripe pattern of the second liquid crystal cell 860.

Figure 13A:
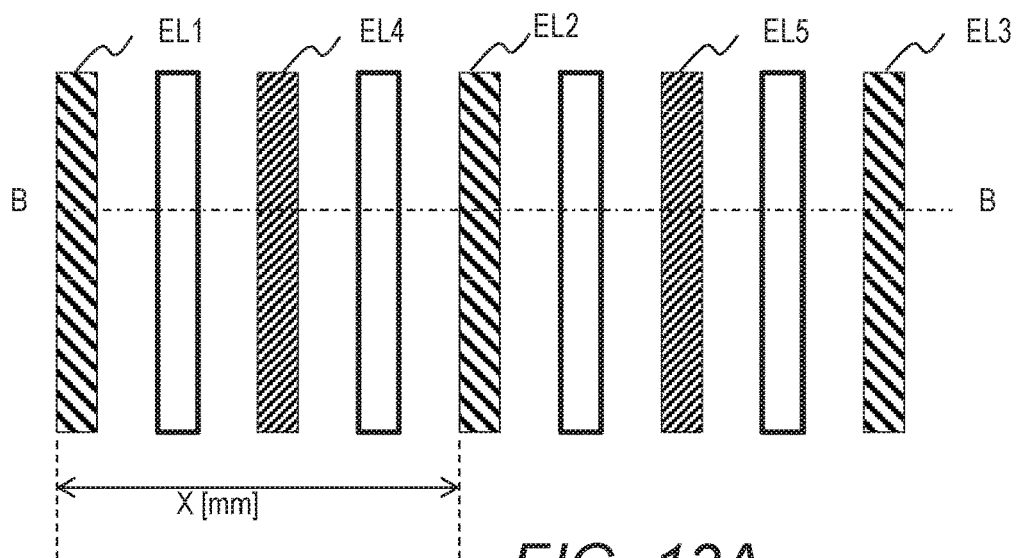
FIG. 13A is a plan diagram illustrating a part of the electrodes in a stripe pattern in a first liquid crystal cell and the voltages to be applied to the electrodes in Embodiment 4.

FIG. 13A is a plan diagram illustrating a part of the electrodes 854 in the stripe pattern in the first liquid crystal cell 850 and the voltages to be applied to the electrodes. The electrodes EL1, EL2, and EL3 at every X mm among the electrodes 854 are provided with a positive voltage of V1 V. The electrodes EL4 and EL5 at the midpoints between electrodes provided with V1 V are grounded and provided with 0 V. The other electrodes 854 are in a floating state. The planar electrode 853 opposed to the electrodes 854 is grounded and provided with 0 V.

Figure 13B:
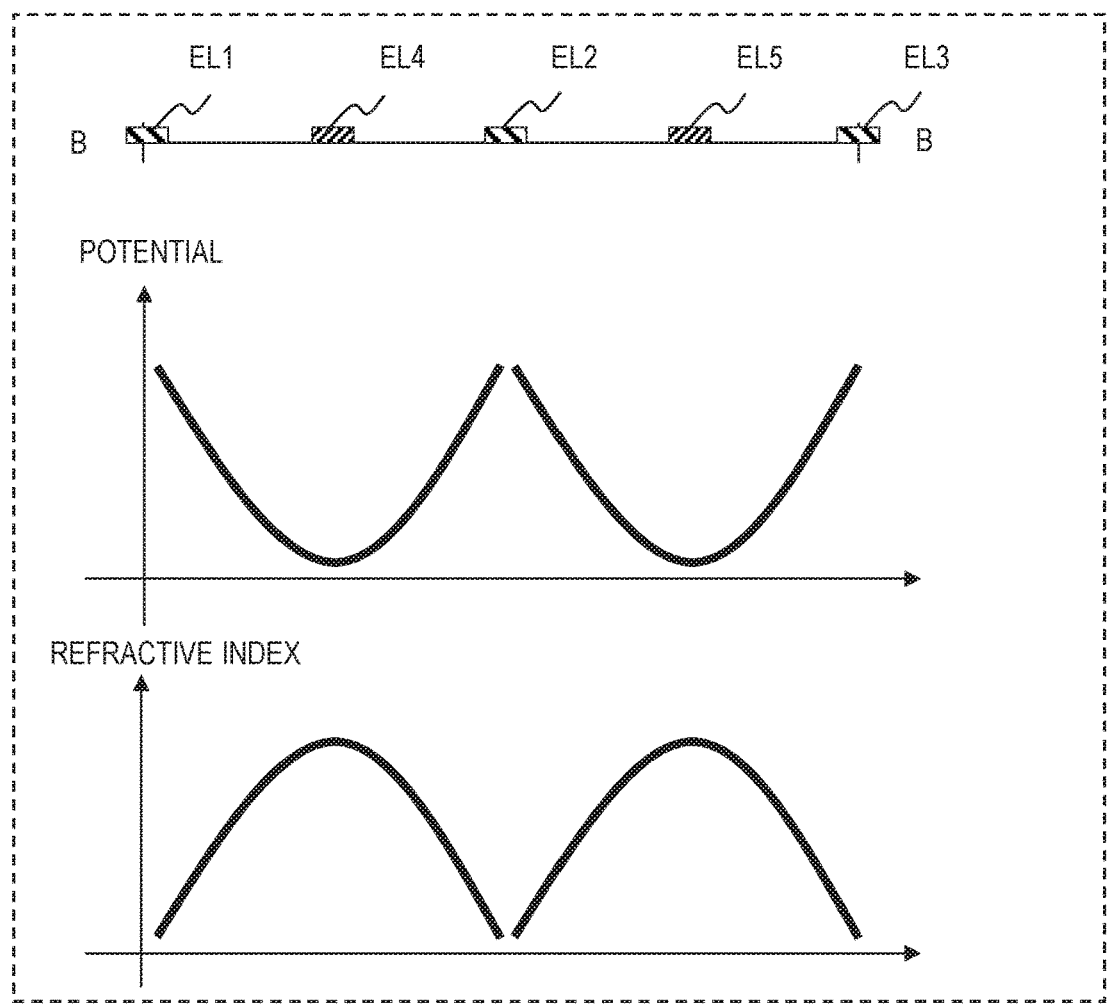
FIG. 13B illustrates a potential distribution and a refractive-index distribution in the cross-section cut along the line B-B in FIG. 13A in Embodiment 4.

FIG. 13B illustrates a potential distribution and a refractive-index distribution in the cross-section cut along the line B-B in FIG. 13A. The refractive index takes the lowest value at the points of the electrodes EL1, EL2, and EL3 provided with V1 V and the highest value at the points of the electrodes EL4 and EL5. The refractive index gradually increases from the points of the electrodes EL1, EL2, and EL3 to the points of the electrodes EL4 and EL5. As understood from the refractive-index distribution in FIG. 13A, each area between electrodes provided with V1 V adjacent to each other works as a cylindrical gradient-index lens having a width of X mm.

The second liquid crystal cell 860 is driven as described above, like the first liquid crystal cell 850. The cylindrical lenses having a width of X mm provided by the second liquid crystal cell 860 cross the cylindrical lenses having a width of X mm provided by the first liquid crystal cell 850 in the planar view. In this example, they cross orthogonally. These do not need to be orthogonal to each other. The liquid crystal lens array 80 works as a gradient-index lens array composed of gradient-index lenses having a diameter and a pitch of X mm.

The voltages to be applied to the electrodes are not limited to the foregoing examples as far as the above-described refractive-index distribution is attained. For example, instead of 0 V in the above-described driving, a predetermined voltage lower than the voltage V1 or a predetermined negative voltage can be applied.

Control of Display Apparatus

Figure 14A:
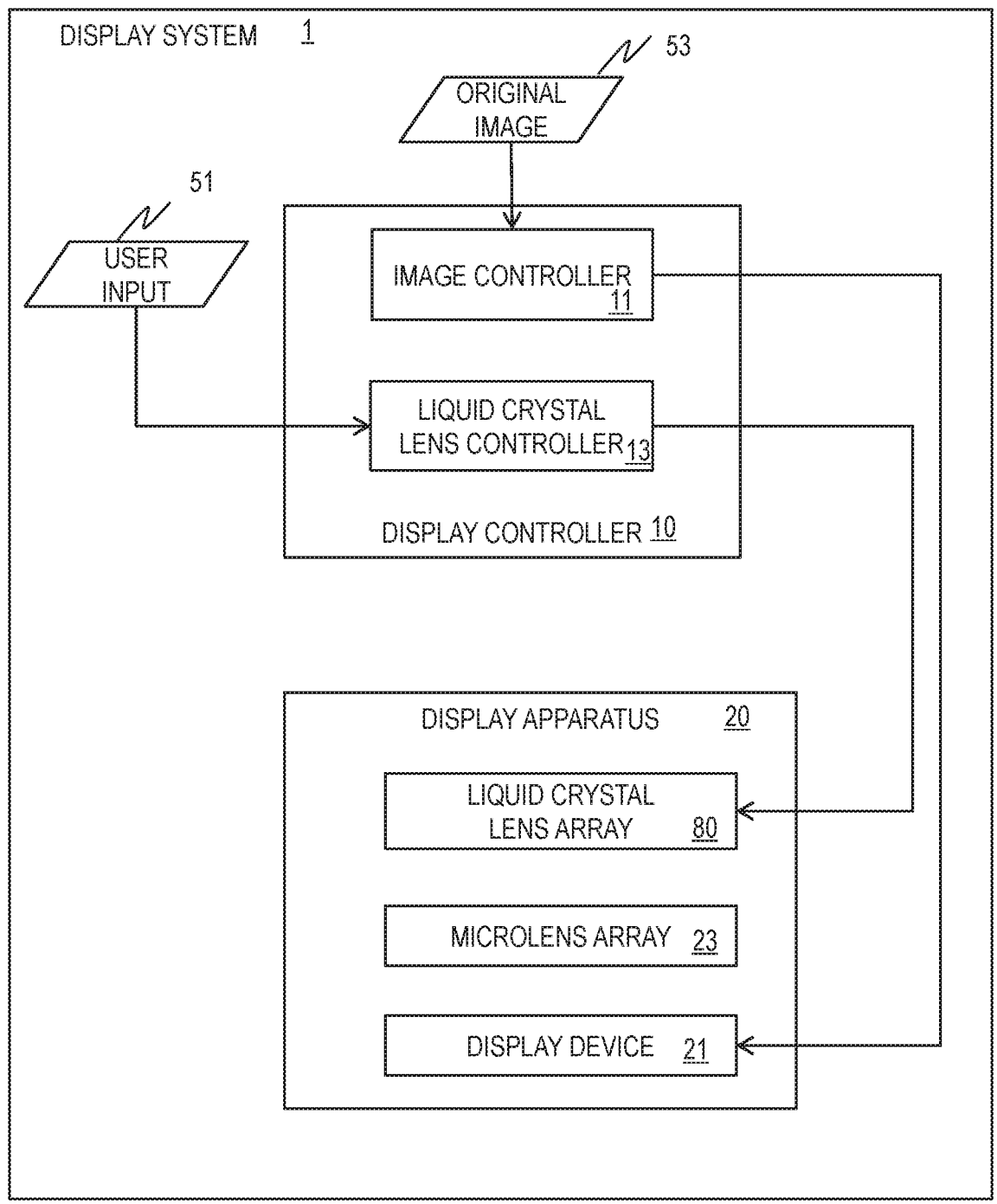
FIG. 14A illustrates a logical configuration of a display system including the display apparatus in Embodiment 4.

Hereinafter, control of the display apparatus 20 including the liquid crystal lens array 80 is described. FIG. 14A illustrates a logical configuration of a display system 1 including the display apparatus 20. The display system 1 further includes a display controller 10 for controlling the display apparatus 20. The display controller 10 includes an image controller 11 for controlling the display device 21 and a liquid crystal lens controller 13 for controlling the liquid crystal lens array 80. In this example, the liquid crystal lens array 80 is provided in front of the elemental images 202.

The image controller 11 sends a control signal for displaying an original image 201 on the display device 21 in accordance with the original image (data) 53. The display device 21 displays the original image 201 on the screen.

The liquid crystal lens controller 13 controls the liquid crystal lens array 80 based on the user input 51. Specifically, the liquid crystal lens controller 13 controls the lens pitch of the liquid crystal lens array 80 in accordance with the information on the display position for the reproduced image 203 specified by the user. The position of the reproduced image 203 can be selected from several positions between the position closest to the user and the position farthest from the user. The selections of the position can include a position in front of the elemental images 202 and a position behind the elemental images 202. The way to specify the position for the reproduced image 203 to the liquid crystal lens controller 13 is not limited to a specific one.

The liquid crystal lens controller 13 holds information to associate the display positions for the reproduced image 203 that can be specified by the user with the voltages to be applied to the electrodes in the liquid crystal lens array 80. The position of the reproduced image 203 depends on the lens pitch of the liquid crystal lens array 80. The lens pitch of the liquid crystal lens array 80 can be controlled as described above. The liquid crystal lens controller 13 sends a control signal to the liquid crystal lens array 80 to achieve the lens pitch associated with the position of the reproduced image 20 specified by the user. As a result, an appropriate reproduced image 203 is generated depending on the user's conditions such as the visual acuity and the position of the user.

Figure 14B:
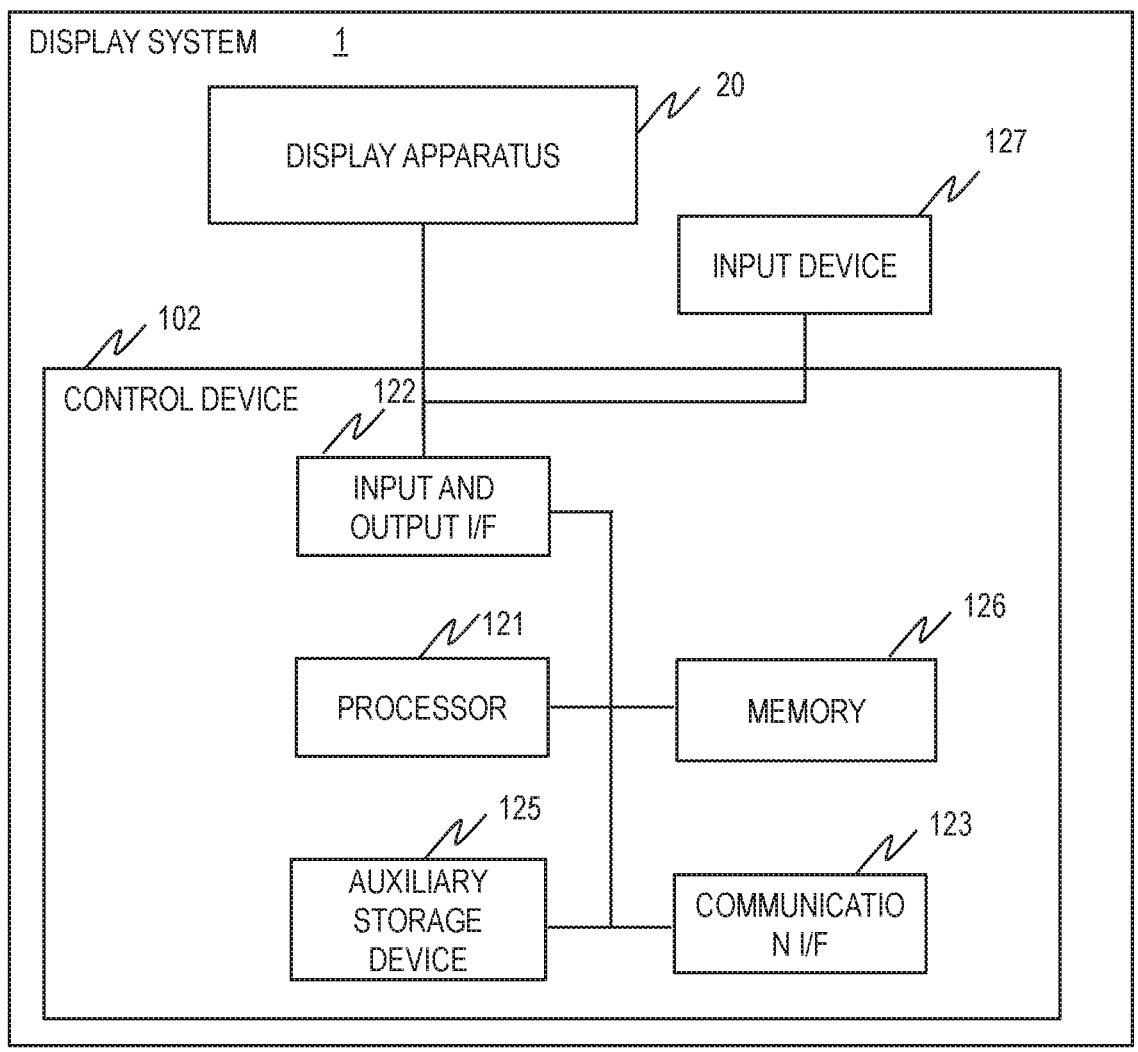
FIG. 14B schematically illustrates an example of the hardware configuration of the display system in Embodiment 4.

FIG. 14B schematically illustrates an example of the hardware configuration of the display system 1. The display system 1 includes a control device 102 and an input device 127 in addition to the display apparatus 20. The control device 102 may have a computer configuration. Specifically, the control device 102 includes a processor 121, an input and output interface (input and output I/F) 122, a communication interface (communication I/F) 123, an auxiliary storage device 125, and a memory 126. These are connected through a bus.

The input and output interface 122 includes a plurality of ports and is connectable with a plurality of external devices. In FIG. 14B, the input and output interface 122 is connected with the display apparatus 20. The control signals for the display device 21 and the liquid crystal lens array 80 are sent from the input and output interface 122.

The input and output interface 122 is further connected with the input device 127. The input device 127 is a device to be operated by a user, such as a touch panel device (to be used with the display device) or an operation button. A signal from the input device 127 is received by the input and output interface 122.

The communication interface 123 is a network interface device for controlling communication with other devices in accordance with a predetermined protocol. The communication interface 123 may include an interface for connecting to an external memory.

The auxiliary storage device 125 is a non-volatile storage device such as a flash memory device and stores a program to be executed by the processor 121 and data to be used in executing the program. The auxiliary storage device 125 in this example stores an original image 53. The auxiliary storage device 125 can store a plurality of original images. Although the original image 53 is a still image, a motion picture can be produced with a plurality of original images.

In general, data stored in the auxiliary storage device 125 is loaded to the memory 126 to be used. The memory 126 can be a volatile memory and stores a program to be used by the processor 121 and data to be used in executing the program. Each of the auxiliary storage device 125, the memory 126, and the combination of these is a storage device.

The processor 121 executes a program stored in the memory 126. The processor 121 operates in accordance with a program to work as a function unit (means) to implement a predetermined function. For example, the processor 121 operates in accordance with an image control program to function as the image controller 11 or operates in accordance with a liquid crystal lens control program to function as the liquid crystal lens controller 13.

Although the image controller 11 and the liquid crystal lens controller 13 in this example are implemented by the processor 121, logical circuits having these functions may be mounted, in addition to the processor 121.

As described above, the liquid crystal lens array 80 works as a microlens array variable in lens pitch. In the configuration where the liquid crystal lens array generates elemental images 202, the voltages to be applied to the electrodes of the liquid crystal lens array are controlled to control the pitch of the elemental images 202. In the configuration where liquid crystal lens arrays are used to generate and integrate elemental images 202, the lens pitch(es) of both or one of the liquid crystal lens arrays can be controlled as specified by the user.

As described in Embodiment 2, a pinhole array can replace a microlens array. As a pinhole array variable in pinhole pitch, a transmissive display device such as a liquid crystal display device can be employed. The display controller 10 displays images through a pinhole array on the liquid crystal display device. Each pinhole transmits light and the area other than the pinholes blocks or diffuses the light. The position of the reproduced image 203 can be controlled by controlling the pinhole pitch.

As set forth above, embodiments of this invention have been described; however, this invention is not limited to the foregoing embodiments. Those skilled in the art can easily modify, add, or convert each element in the foregoing embodiment within the scope of this invention. A part of the configuration of one embodiment can be replaced with a configuration of another embodiment or a configuration of an embodiment can be incorporated into a configuration of another embodiment.

What is claimed is:

1. A display apparatus comprising:
   a display device configured to display an original image at an original image display position;
   a second array of a lens array or a pinhole array; and
   a first array of a lens array or a pinhole array disposed distant from the display device and the second array between the display device and the second array,
   wherein the first array is configured to form a plurality of elemental images generated from the original image at positions between the first array and the second array, and
   a light direction control panel disposed between the first array and the second array,
   wherein pitch of the plurality of elemental images is different from lens pitch or pinhole pitch of the second array,
   wherein the second array is configured to integrate the plurality of elemental images to generate a single reproduced image of the original image, and
   wherein the light direction control panel is configured to control direction of at least part of light from the plurality of elemental images so as to be used to generate the reproduced image.

2. The display apparatus according to claim 1, wherein the lens pitch or pinhole pitch of the second array is longer than pitch of the plurality of elemental images, and
   wherein the reproduced image is a virtual image located behind the plurality of elemental images.

3. The display apparatus according to claim 1, wherein the lens pitch or pinhole pitch of the second array is shorter than pitch of the plurality of elemental images, and
   wherein the reproduced image is a real image located in front of the plurality of elemental images.

4. The display apparatus according to claim 1, wherein the plurality of elemental images are formed within the light direction control panel.

5. The display apparatus according to claim 1, wherein the light direction control panel is a diffuser panel.

6. A display apparatus comprising:
   a display device configured to display an original image at an original image display position;
   a second array of a lens array or a pinhole array;
   a first array of a lens array or a pinhole array disposed distant from the display device and the second array between the display device and the second array,
   wherein the first array is configured to form a plurality of elemental images generated from the original image at positions between the first array and the second array,
   wherein pitch of the plurality of elemental images is different from lens pitch or pinhole pitch of the second array,
   wherein the second array is configured to integrate the plurality of elemental images to generate a single reproduced image of the original image,
   wherein at least either one of the first array and the second array is a lens array variable in lens pitch,
   wherein the lens array variable in lens pitch includes:
      a first substrate and a second substrate opposed to each other;
      liquid crystal between the first substrate and the second substrate;
      a first electrode pattern in stripes formed on a face of the first substrate facing the second substrate; and
      a second electrode pattern in stripes formed on a face of the second substrate facing the first substrate to cross the first electrode pattern,
   wherein electrodes at predetermined distances in the first electrode pattern are provided with a predetermined voltage and the other electrodes in the first electrode pattern are in a floating state, and
   wherein electrodes at predetermined distances in the second electrode pattern are provided with a voltage lower than the predetermined voltage and the other electrodes in the second electrode pattern are in a floating state.

7. The display apparatus according to claim 6, wherein electrodes at the middle between electrodes provided with the predetermined voltage in the first electrode pattern are provided with the voltage lower than the predetermined voltage.

8. A display apparatus comprising:
   a display device configured to display an original image at an original image display position;
   a second array of a lens array or a pinhole array;
   a first array of a lens array or a pinhole array disposed distant from the display device and the second array between the display device and the second array,
   wherein the first array is configured to form a plurality of elemental images generated from the original image at positions between the first array and the second array,
   wherein pitch of the plurality of elemental images is different from lens pitch or pinhole pitch of the second array,
   wherein the second array is configured to integrate the plurality of elemental images to generate a single reproduced image of the original image,
   wherein at least either one of the first array and the second array is a lens array variable in lens pitch, wherein the lens array variable in lens pitch includes a first liquid crystal cell and a second liquid crystal cell stacked one above the other, wherein the first liquid crystal cell includes:
- a first substrate and a second substrate opposed to each other;
- liquid crystal between the first substrate and the second substrate;
- a first planar electrode formed on a face of the first substrate facing the second substrate; and
- a first electrode pattern in stripes formed on a face of the second substrate facing the first substrate, wherein the second liquid crystal cell includes:
- a third substrate and a fourth substrate opposed to each other;
- liquid crystal between the third substrate and the fourth substrate;
- a second planar electrode formed on a face of the third substrate facing the fourth substrate; and
- a second electrode pattern in stripes formed on a face of the fourth substrate facing the third substrate to cross the first electrode pattern, wherein electrodes at predetermined distances in the first electrode pattern are provided with a first predetermined voltage and the other electrodes in the first electrode pattern are in a floating state, wherein the first planar electrode is provided with a voltage lower than the first predetermined voltage, wherein electrodes at predetermined distances in the second electrode pattern are provided with a second predetermined voltage and the other electrodes in the second electrode pattern are in a floating state, and wherein the second planar electrode is provided with a voltage lower than the second predetermined voltage.

* * * * *